United States Patent [19]

Young

[11] 4,268,342

[45] May 19, 1981

[54] APPARATUS FOR ASSEMBLING CLOSURES AND CONTROL SYSTEMS THEREFOR

[75] Inventor: Jerry W. Young, Weston, Mo.

[73] Assignee: Phillips Petroleum Company, Bartlesville, Okla.

[21] Appl. No.: 55,247

[22] Filed: Jul. 6, 1979

[51] Int. Cl.[3] .............................................. B32B 31/00

[52] U.S. Cl. .................................... 156/357; 156/538; 493/18; 493/110

[58] Field of Search ............... 156/350, 538, 356, 357, 156/351; 93/36 B, 36.05, 36.1, 36.2, 36.8, 39.1 R, 39.2, 39.3, 49 AC

[56] References Cited

U.S. PATENT DOCUMENTS 3,469,507 9/1969 West .............................. 93/39.11 R

FOREIGN PATENT DOCUMENTS 674705 6/1952 United Kingdom ................ 93/36 B

*Primary Examiner*—David A. Simmons

[57] ABSTRACT

An improved multi-station machine is disclosed for assembling ring-type closures from generally cylindrical paperboard cylinders and generally circular paperboard discs. The machine employs a rotatable dial plate, carrying eight mandrels and an improved ring clamping system, which dial plate is incrementally rotated by an automatic indexer assembly relative to the various operating stations which consist of a ring feed station, a disc feed station, an adhesive dispensing station, a curling station, a grooving station and a closure ejecting station. Means are provided for controlling the operation of the various stations so that they operate in substantial synchronism with one another and with the rotatable dial plate. The improved disc feed station automatically feeds the lowermost disc from a stack of discs to a position over a ring on the dial plate and simultaneously forms a peripheral skirt on the disc and positions it in an open end of the ring. The adhesive dispensing station employs a pair of tube pumps to dispense adhesive and lubricant on partially assembled ring-type closures. The grooving station automatically forms a peripheral groove and a corresponding radially inwardly extending rib in the cylindrical wall of an assembled ring-type closure. The closure ejecting station provides vacuum means for withdrawing a completed closure from a mandrel on the dial plate and pressurized air means for assisting in the automatic removal of the closure from the mandrel and for automatically propelling the thus removed mandrel from the machine. The ring feed station provides means for preventing the introduction of rings onto the dial plate in response to an indication of insufficient discs at the disc feed station. Control means are provided for manually indexing the dial plate as well as prevention of disc feed, and adhesive and lubricant dispensing if an appropriate ring is not present on the dial plate, as well as control means for preventing ring feed if sufficient discs are not available at the disc feed station. Various other control features are disclosed for the prevention of operator injury, material waste and machine jamming.

32 Claims, 27 Drawing Figures

APPARATUS FOR ASSEMBLING CLOSURES AND CONTROL SYSTEMS THEREFOR

The invention relates generally to improvements in packaging apparatus. In another aspect the invention relates generally to improvements in packaging method. In yet another aspect the invention relates to apparatus for assembling container closures. In still another aspect the invention relates to a control system for controlling the operation of apparatus for assembling container closures.

Generally cylindrical paperboard containers and paperboard disc bottom closures are universally accepted for the packaging for ice cream and similar products. The large, world-wide market for ice cream requires the production of great numbers of such containers and the ring-type closures which are used in conjunction with the containers.

It is desirable to produce such ring-type closures at a high production rate to achieve maximum production economies. Each closure is preferably constructed of a generally cylindrical paperboard ring and a generally circular paperboard disc with a rolled and glued joint mutually securing the ring and disc together. Such closures are also preferably provided with a peripheral groove formed in the outer wall of the ring with a corresponding radially inwardly extending ridge or rib formed on the inner wall of the ring for engaging a radially outwardly rolled rim about the open top of a container to secure the closure thereto.

It would, therefore, be desirable to provide method and apparatus for assembling ring-type closures from generally cylindrical rings of paperboard or other suitable material and generally circular discs of paperboard or other suitable material which requires a minimum amount of manual labor and which can meet the production rates dictated by the industry which requires such closures for the packaging of a particular product.

It is, therefore, an object of the present invention to provide method and apparatus well suited for the production of ring-type closures at a high rate.

Another object of the invention is to provide a multistation machine for the assembly of ring-type closures from generally cylindrical rings and generally circular discs which is fast and reliable in operation.

Yet another object of the invention is to provide a machine for assembling ring-type closures which is automatic in operation.

Still another object of the invention is to provide a machine for assembling ring-type closures which requires minimum manual effort in the production of such closures.

Another object of the invention is to provide a control system for use with a machine for assembling ring-type closures which minimizes the possibility of machine malfunction or operator injury.

Yet another object of the invention is to provide a machine and associated control system which is economical to operate, easy to maintain and simple in its construction.

The present invention contemplates a control system for use with an apparatus for assembling closures, each closure including a generally cylindrically shaped ring having open ends and a generally circular disc, the apparatus being of the type which includes a plate having an upper surface and a plurality of ring receiving means on the upper surface equally spaced along a circle on the plate and each adapted for receiving one of the rings thereon. The apparatus further includes plate drive means operatively related to the plate for rotating the plate about an axis of rotation concentric with the circle along which the ring receiving means are equally spaced. Ring feed means are positioned adjacent the plate for sequentially positioning the rings on respective ones of the ring receiving means as the plate is rotated past the ring feed means, while disc feed means are positioned adjacent the plate for sequentially positioning the discs within respective ones of the rings on the ring receiving means as the plate is rotated past the disc feed means. The apparatus includes adhesive dispensing means positioned adjacent the plate for dispensing a quantity of adhesive within respective ones of the rings on the ring receiving means as the plate is rotated past the adhesive dispensing means, and lubricant dispensing means positioned adjacent the plate for dispensing a quantity of lubricant on respective ones of the rings on the ring receiving means as the plate is rotated past the lubricant dispensing means. Also provided in the apparatus are ejecting means positioned adjacent the plate for ejecting respective ones of the closures assembled by the apparatus from the ring receiving means as the plate is rotated past the ejecting means. The control system for use with such apparatus comprises first ring sensing means positioned intermediate the ring feed means and the disc feed means for sensing the presence of one of the rings on one of the ring receiving means passing thereby and providing a signal indicating the presence of the ring on the ring receiving means, and means responsive to the signal from the first ring sensing means and operatively related to the disc feed means for automatically allowing the positioning of one of the discs by the disc feed means within one of the open ends of the ring sensed by the first ring sensing means, and, alternately, in the absence of said signal from the first ring sensing means, preventing action by the ring feed means to position one of the discs on one of the ring receiving means not having one of the rings thereon.

Other objects, advantages and aspects of the invention will be readily apparent to those skilled in the art from a reading of the following detailed description and claims in conjunction with the accompanying drawings in which:

Figure 1:
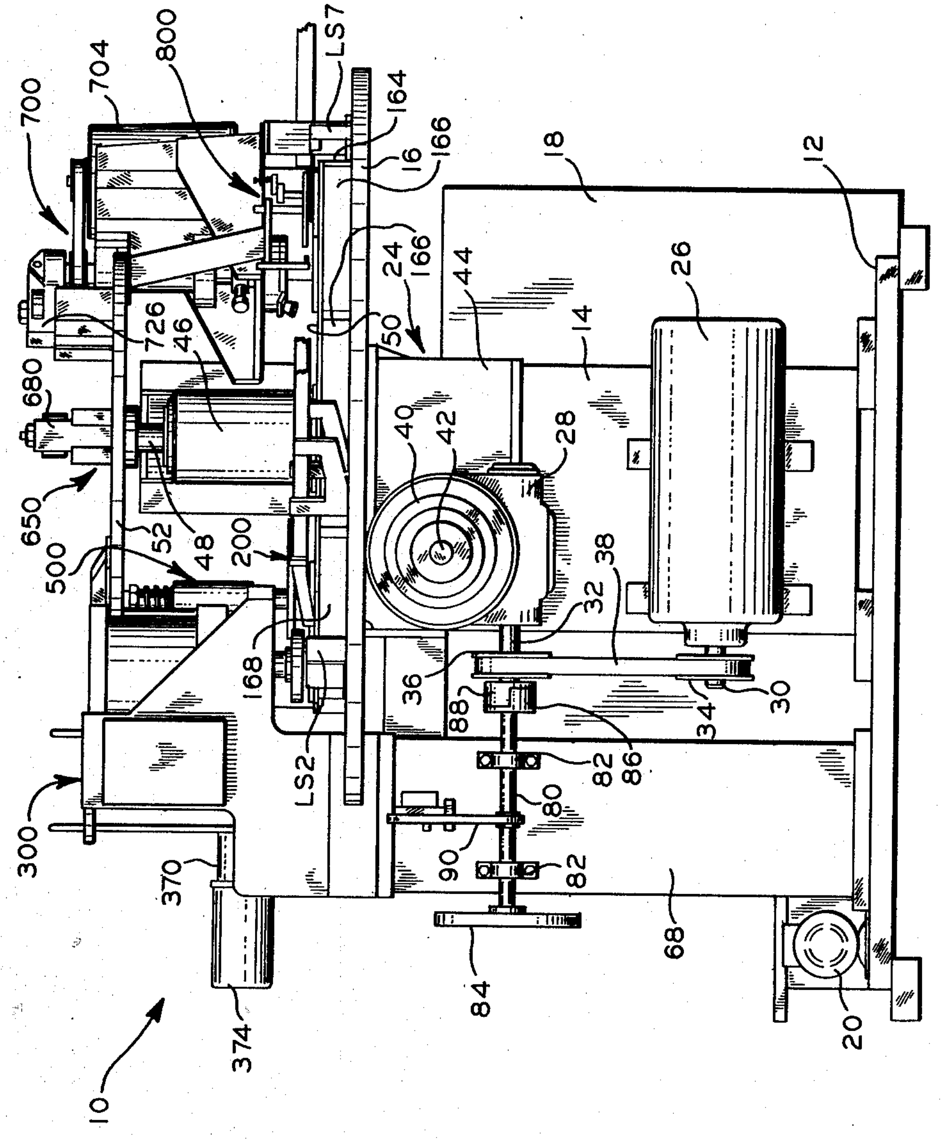
FIG. 1 is a side elevation view of a machine for assembling ring-type closures from generally cylindrical rings and generally circular discs constructed in accordance with the present invention.
Figure 2:
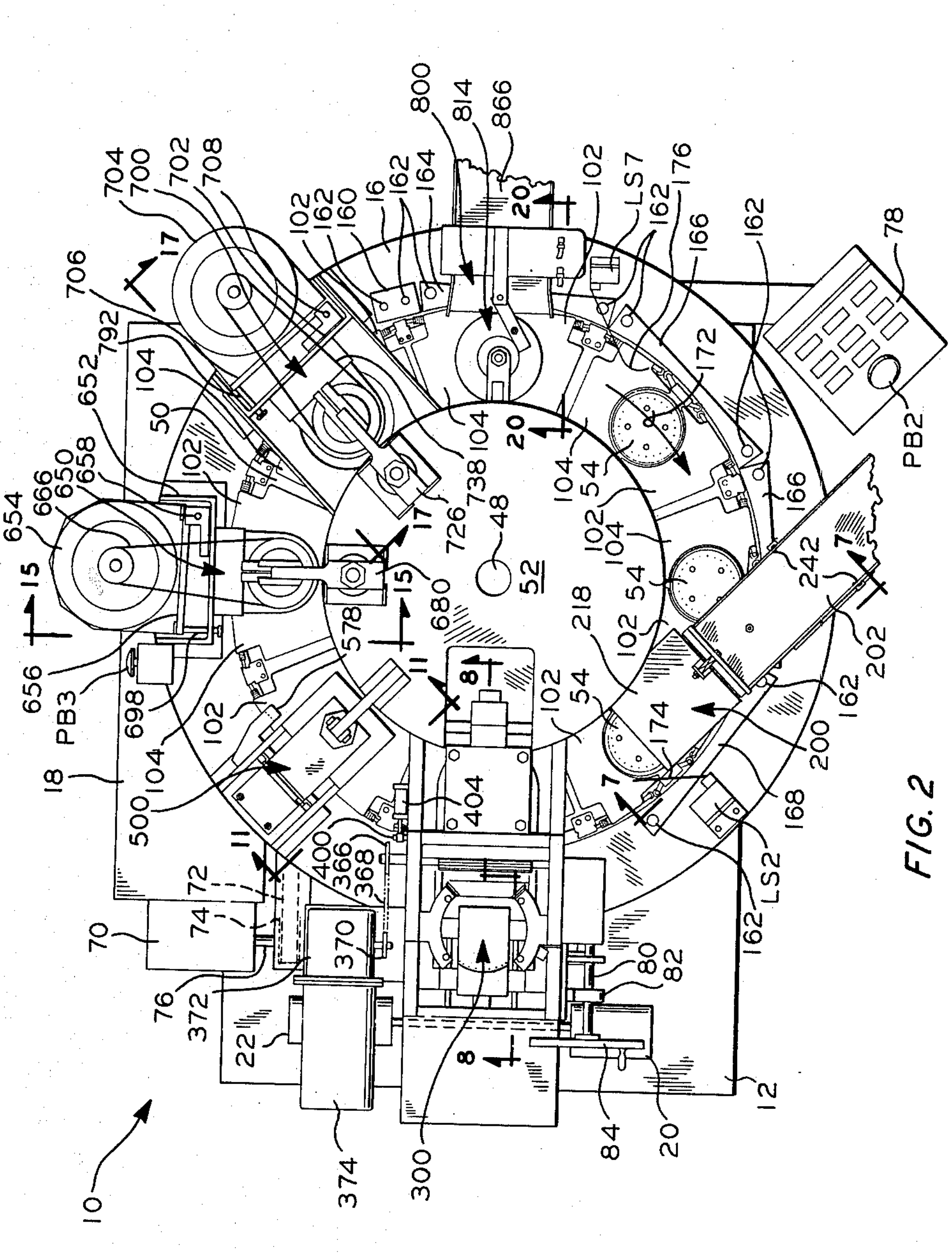
FIG. 2 is a top plan view of the machine of FIG. 1.

Referring now to the drawings, and to FIGS. 1 and 2 in particular, apparatus is disclosed therein for assembling ring-type closures and is generally designated by the reference character 10. The apparatus 10 includes a base plate 12, a drive unit pedestal 14 mounted on the base plate 12, a generally horizontal tool mounting plate 16 mounted on the drive unit pedestal 14, a main control box 18 mounted on the base plate 12, and a vacuum pump drive motor 20 and vacuum pump 22 mounted on the base plate 12. The drive unit pedestal 14 and tool mounting plate 16 mounted thereon comprise a portion of an automatic indexer assembly 24. An automatic indexer assembly suitable for use in the apparatus 10 is available from Ferguson Machine Company, 11820 Lackland Road, St. Louis, Mo. The indexer assembly 24 includes an electric drive motor 26 and a speed reducer 28. The output shaft 30 of the motor 26 is drivingly connected to the input shaft 32 of the speed reducer 28 by suitable means such as pulleys 34 and 36 and a flexible drive belt 38. The speed reducer 28 is connected by means of a suitable clutch mechanism 40 to the input shaft 42 of an indexer drive unit 44. The indexer drive unit 44 is provided with a rotatable output shaft 46 and a reciprocating output shaft 48. The indexer drive unit 44 is adapted to rotate the rotatable output shaft 46 in increments of 45° about a vertical axis of rotation and is adapted to simultaneously reciprocate the reciprocating output shaft 48 along a vertical line coaxial with the axis of rotation of the output shaft 46 and in synchronism therewith.

A dial plate 50 is fixedly secured to the rotatable output shaft 46 and is adapted to incrementally rotate with the output shaft 46 in response to the rotation of the input shaft 42 at a substantially constant rate by means of the drive motor 26 and speed reducer 28. A vertically reciprocatable platen 52 is fixedly secured to the upper end portion of the reciprocating output shaft 48 and is adapted to recirpocate with the reciprocating output shaft 48. The indexer driver unit 44 is adapted, as mentioned above, to rotate the dial plate 50 in increments of 45° with a predetermined period of dial plate dwell time between each such incremental rotation of the dial plate. The indexer drive unit 44 is further adapted to actuate the reciprocating output shaft 48 in synchronism with the incremental rotation of the dial plate 50 such that during each predetermined period of dial plate dwell, the reciprocating output shaft 48 moves the vertically reciprocatable platen 52 from a first position distal from the dial plate to a second position nearer to the dial plate and back to the first position. The vertical reciprocation of the platen 52 can be any suitable distance, however a vertical reciprocation of about $1\frac{1}{2}$ inch (3.8 cm) has proved advantageous in the present apparatus.

Figure 6:
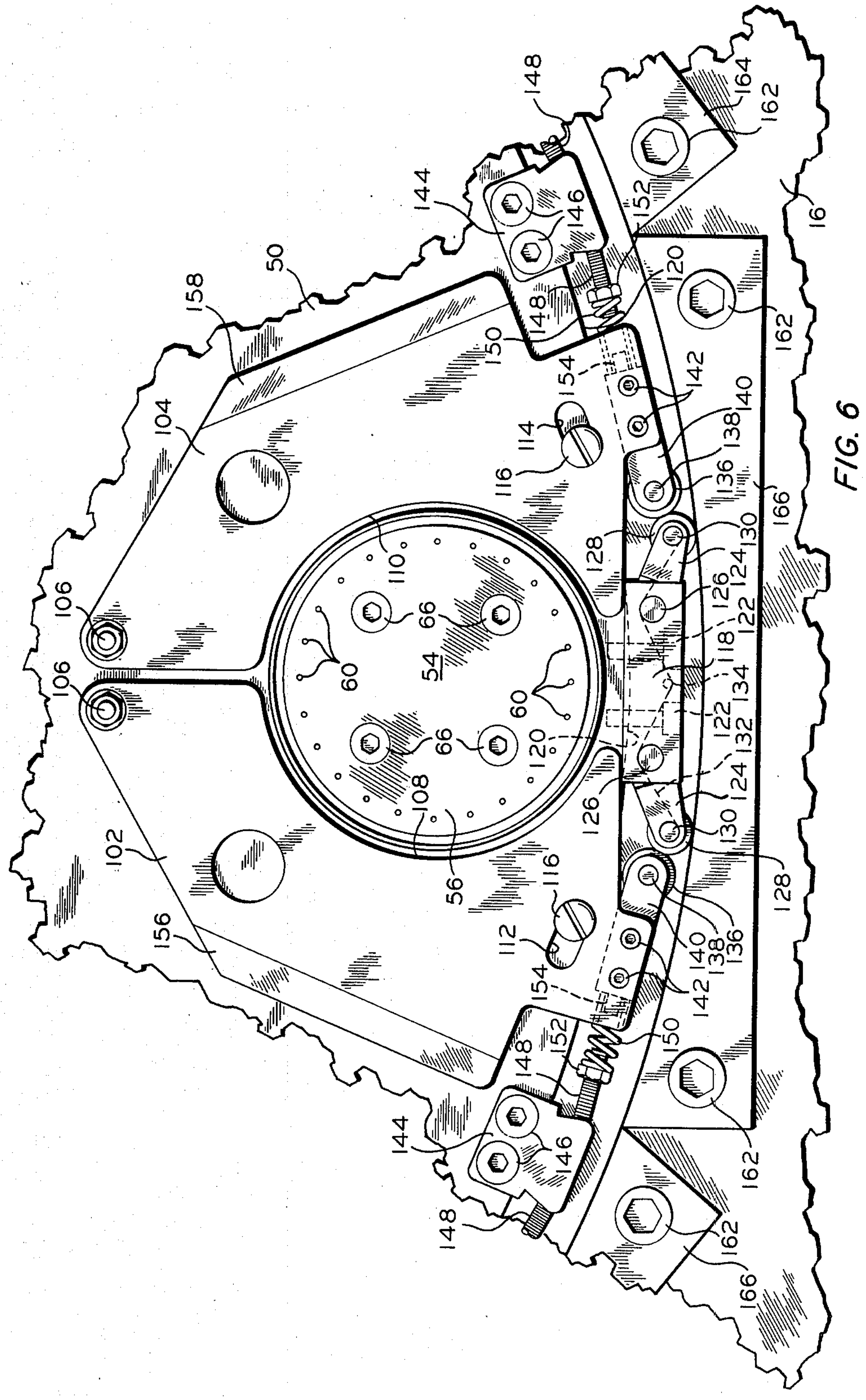
FIG. 6 is an enlarged top plan view of a portion of the machine of FIG. 1 illustrating construction details of the dial plate and cam actuated mandrel clamping mechanism.
Figure 20:
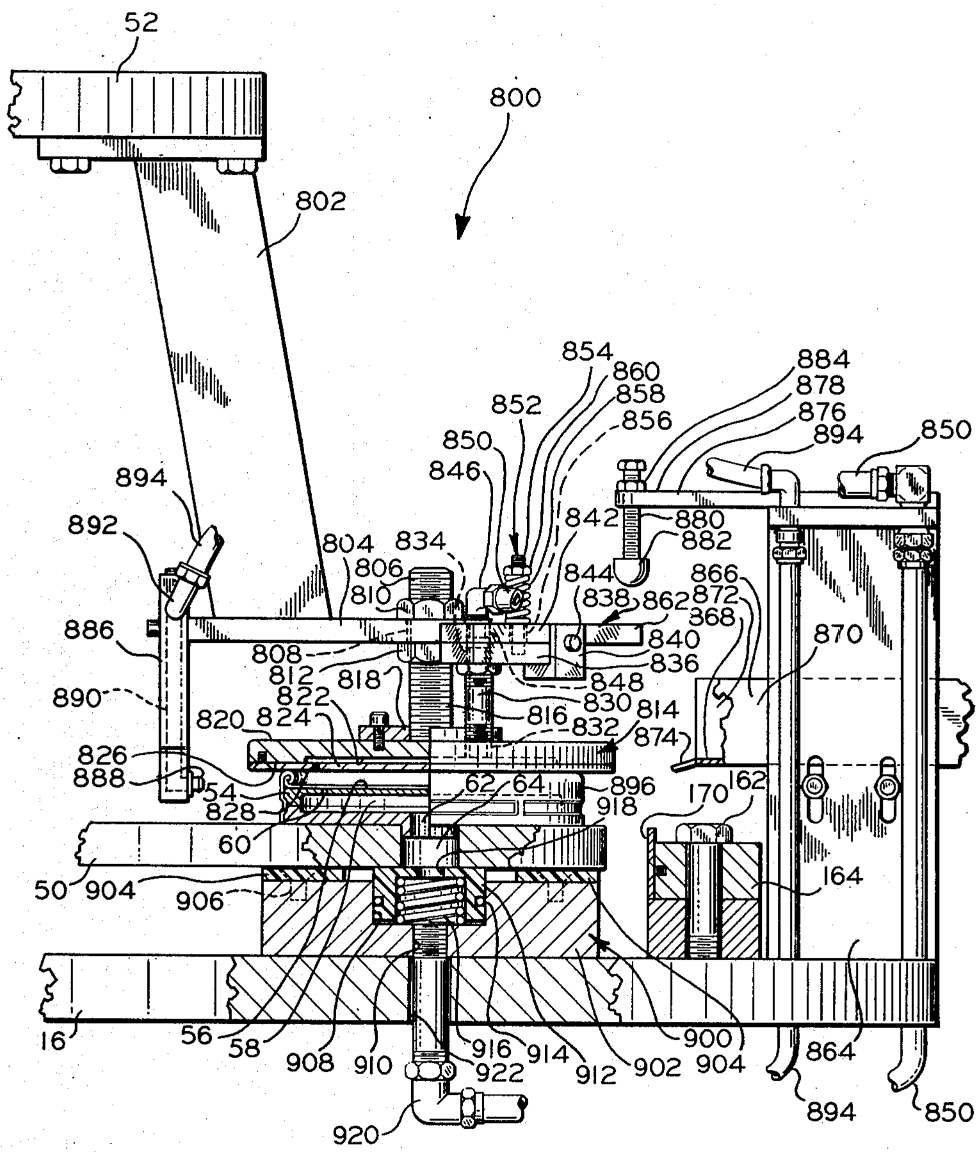
FIG. 20 is an enlarged fragmentary view taken along line 20—20 of FIG. 2 illustrating construction details of the closure ejecting station with portions broken away to facilitate understanding.

The dial plate 50 is provided with eight mandrels 54 mounted on and extending upwardly from the dial plate 50 along a circle concentric with the axis of rotation of the dial plate and angularly spaced one from the other at an angle of 45° about the axis of rotation of the dial plate. The mandrels 54 serve as ring receiving means during the assembling of ring-type closures on the apparatus 10. As shown in FIGS. 6 and 20, each mandrel has a substantially flat top surface 56 and a cavity 58 formed in the interior thereof. A plurality of apertures 60 communicate between the top surface 56 and the cavity 58 of each mandrel 54. A passage 62 is formed in the lower portion of each cavity 56 and communicates with a corresponding passage 64 in the dial plate 50. Each mandrel 54 is secured to the dial plate 50 by suitable means such as a plurality of threaded bolts 66.

The apparatus 10 further includes six operating stations which each perform a sequential function in the assembly of ring-type closures on the apparatus. Each of the operating stations is positioned adjacent a corresponding one of the mandrels 54 when the dial plate 50 is positioned in the dwell position for the predetermined period of time. The operating stations consist of a ring feed station or mechanism 200 mounted on the tool mounting plate 16, a disc feed station or mechanism 300 mounted on the tool mounting plate 16 and additionally supported by a disc feed pedestal 68 mounted on the base plate 12, an adhesive dispensing station or mechanism 500 mounted on the tool mounting plate 16, a curling station or mechanism 650 mounted on the tool mounting plate 16, a grooving station or mechanism 700 mounted on the tool mounting plate 16 and a closure ejecting station or mechanism 800 mounted on the tool mounting plate 16.

The apparatus 10 further includes a rotating cam operated limit switch mechanism 70 mounted on the exterior of one end of the main control box 18. The limit switch mechanism 70 is driven by suitable means connected to one end of the shaft 42 of the automatic indexer assembly 24. It is presently preferred to drive the limit switch mechanim 70 by means of a flexible endless drive member such as a grooved timing belt 72 connected via a corresponding pulley 74 to the input shaft 76 of the limit switch mechanism 70. A suitable limit switch mechanism for use in the apparatus 10 is available from Gemco Electric Company, Clauson, Michigan and is designated by the model No. 1980-106L-SP-X.

The apparatus 10 is further provided with an operator's consolet 78, as shown in FIG. 2, the consolet 78 being mounted on the tool mounting plate 16 proximate to the ring feed station mechanism 200 so as to facilitate single operator control of the apparatus 10 while the operator manually feeds the ring feed station as will be described in detail hereinafter.

Figure 3:
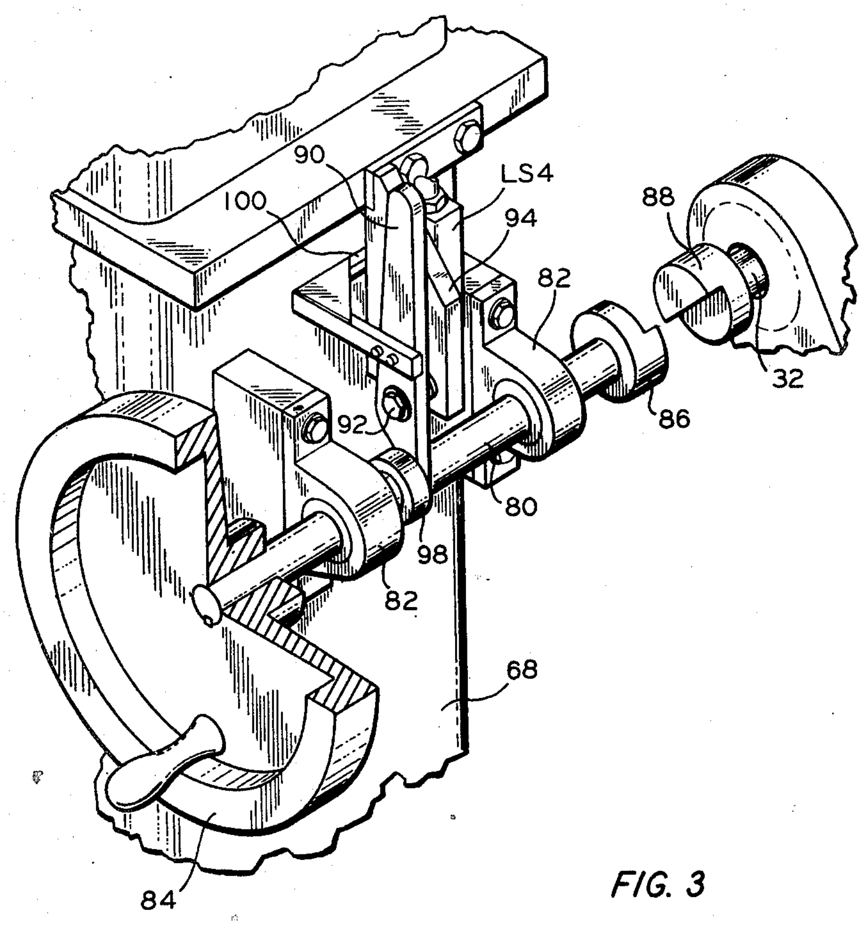
FIG. 3 is an enlarged isometric view of a portion of the machine of FIG. 1 illustrating construction details of a hand crank and interlock mechanism.
Figure 4:
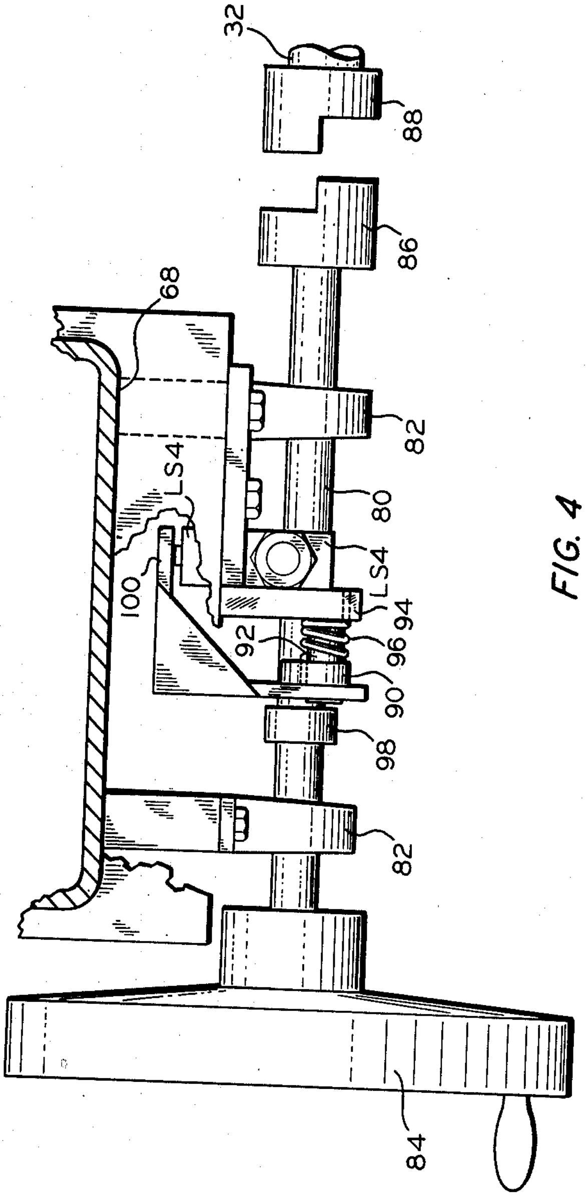
FIG. 4 is an enlarged top plan view of the hand crank and interlock mechanism of FIG. 3.
Figure 5:
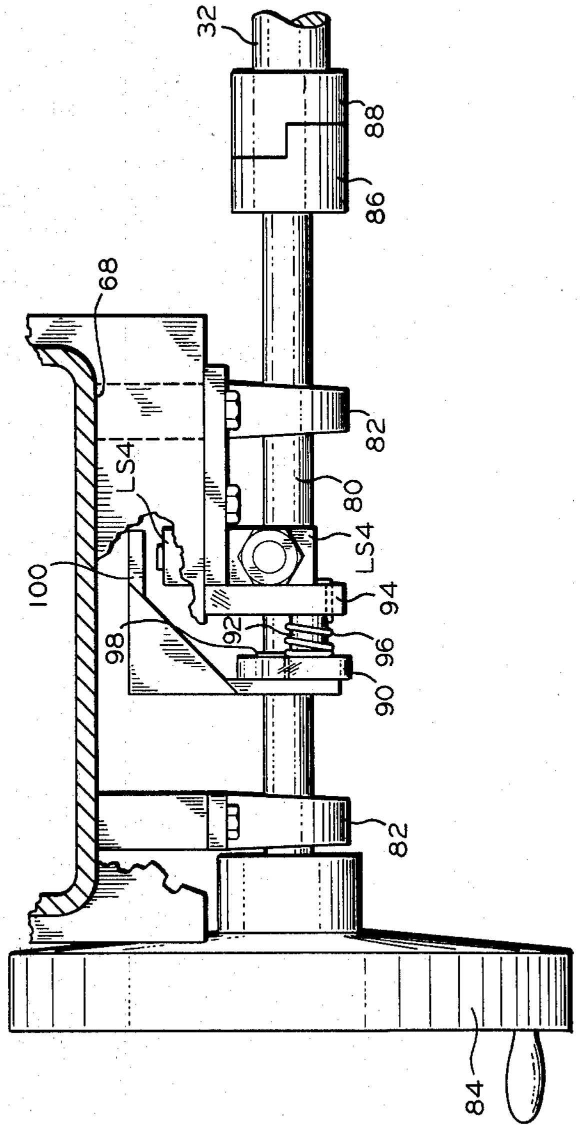
FIG. 5 is an enlarged side elevation view of the hand crank and interlock mechanism of FIG. 3.

The apparatus 10 is further provided with means for manually indexing the dial plate 50 and reciprocating the reciprocatable platen 52 when desired. Manual indexing of the apparatus 10 is achieved by means of a crankshaft 80 journaled on a pair of suitable ball bearing pillow blocks 82 mounted on the pedestal 68 and positioned so as to coaxially align the crankshaft 80 with the input shaft 32 of the speed reducer 28. The crankshaft 80 is adapted to slide longitudinally relative to the bearings 82. A suitable hand crank 84 is drivingly secured to a first end portion of the crankshaft 80 while the opposite end portion of the crankshaft is drivingly secured to one element of a dog clutch coupling 86. A second dog clutch element 88 is drivingly secured to the outer end portion of the input shaft 32 of the speed reducer 28. The dog clutch elements 86 and 88 are adapted to achieve mutual driving engagement when the crankshaft 80 is moved longitudinally to the right as viewed in FIG. 1, thereby permitting rotation of the crankshaft 80 by the hand crank 84 to directly rotate the input shaft 32 of the speed reducer 28. This positioning of the crankshaft 80 is also illustrated in greater detail in FIG. 5. As shown in FIG. 4, movement of the crankshaft 80 to the left as viewed therein and in FIG. 1 disengages the dog clutch elements 86 and 88 thus permitting the shaft 32 to rotate freely relative to the crankshaft 80 when driven by the electric drive motor 26. The crankshaft 80 is maintained in the position illustrated in FIG. 4 by means of a mechanical interlock mechanism which must be deliberately overcome in order to achieve mutual engagement of the dog clutch elements 86 and 88. The mechanical interlock mechanism comprises an interlock lever 90 which is pivotally secured by means of a bolt 92 to a bracket 94 which is in turn fixedly secured by suitable means such as threaded bolts to the pedestal 68. The lower end portion of the lever 90 is yieldably urged into contact with the outer surface of the shaft 80 by means of a torsion spring 96 disposed about the bolt 92 and secured at one end to the bracket 94 and secured at the opposite end to the interlock lever 90. A collar 98 is fixedly secured about the crankshaft 80 and prevents the longitudinal movement of the crankshaft 80 toward the input shaft 32 of the speed reducer 28 when the interlock lever 90 is biased into position, with the lower end portion of the interlock lever 90 contacting the crankshaft surface, by abutting the lower end portion of the interlock lever 90 as shown in FIGS. 3 and 4. The crankshaft 80 can be released for movement into driving engagement with the input shaft 32 by rotating the upper end portion of the lever 90 inwardly about the bolt 92 toward the pedestal 68 to thereby permit the collar 98 to pass freely underneath the lower end portion of the lever 90. A hand crank safety interlock switch LS4 is mounted on the bracket 94 adjacent the interlock lever 90. The interlock lever 90 is provided with a switch actuator arm 100 which is adapted to contact the actuator button of the swiitch LS4 when the dog clutch elements 86 and 88 are fully disengaged as illustrated in FIGS. 3 and 4. When the interlock lever 90 is rotated as described above to free the crankshaft 80 for longitudinal movement toward the speed reducer 28, the switch actuator arm 100 is moved out of contact with the actuator button of the hand crank safety interlock switch LS4 as illustrated in FIG. 5. When the switch LS4 is in the condition illustrated in FIG. 5, the electric drive motor 26 is deactivated and the brake on the automatic indexer assembly 24 is applied to prevent the inadvertent automatic operation of the apparatus 10 while the manual hand crank apparatus is engaged with the input shaft of the speed reducer 28. The arm 100 is retained in the position illustrated in FIG. 5 as long as the coupling elements 86 and 88 are engaged due to the positioning of the collar 98 under the lower end portion of the interlock lever 90 thus preventing the interlock lever from rotating back to the position illustrated in FIG. 4 under the urging of the torsion spring 96. The apparatus 10 can only be manually cranked when the "turn manual crank" button PB7A is pressed on the consolet 78.

The dial plate 50 is further provided with a plurality of clamp means positioned respectively adjacent each of the ring receiving mandrels 54 for selectively alternately gripping and releasing a corresponding generally cylindrical ring. As best shown in FIGS. 2 and 6, each clamp means comprises a pair of clamp jaws 102 and 104 each pivotally secured by suitable means, such as an eccentric bolt 106 or a bolt and eccentric bushing, to the dial plate 50 intermediate the respective mandrel 54 and the rotational axis of the dial plate 50. The eccentric bolts 106 provide means for adjusting the precise location of the pivot point of each of the clamp jaws 102 and 104 to facilitate the clamping action on a corresponding ring. The clamp jaws 102 and 104 are positioned on opposite sides of the corresponding mandrel 54 and are provided with respective jaw faces 108 and 110 sized and shaped to conform to a portion of the generally cylindrical outer surface of the generally cylindrical ring to be positioned on the mandrel 54. Respective slots 112 and 114 are formed in the clamp jaws 102 and 104 opposite the pivot points of the clamp jaws. A threaded shoulder bolt 116 extends through each of the slots 112 and 114 and is threadedly secured to the dial plate 50 to provide means for limiting the rotation of each of the clamp jaws about the respective bolt 106 to a predetermined amount.

A roller mounting block 118 is fixedly secured to the circumferential outer surface 120 of the dial plate 50 adjacent the respective mandrel 54 by suitable means such as a pair of threaded bolts 122. A roller yoke 124 is pivotally secured to each end of a corresponding roller mounting block 118 by means of a suitable roller pin 126 extending through the roller mounting block 118 and the respective roller yoke 124. Each roller pin 126 is provided with a circumferential groove on the lower end portion thereof which extends slightly below the roller mounting block 118. A roller 128 is journaled on the outer end portion of each of the roller yokes 124 by means of a corresponding roller pin 130 extending through the corresponding roller yoke 124 and roller 128. Each roller pin 130 is provided with a circumferential groove on the lower end portion thereof extending slightly below the corresponding roller yoke 124. The roller yokes 124 are biased radially inwardly relative to the rotational axis of the dial plate 50 by means of a spring clip 132 disposed on the lower side of the roller mounting block 118 and mutually engaging the lower end portions of each of the roller pins 126 and 130 as illustrated in FIG. 6. The medial portion of the spring clip 132 is secured to the bottom portion of the roller mounting block 118 by means of a spring retainer screw 134 which is threadedly secured to the roller mounting block 118. The spring clip 132 further functions to retain the roller pins 126 and 130 in their respective positions in the roller mounting block and roller yokes by engaging the roller pins 126 and 130 in their respective circumferential grooves as mentioned above. The use of the spring retainer clip 132 permits smooth and quiet operation of the apparatus 10 as well as quick and simple means for removing and installing rollers 128 and roller yokes 124 on the valve plate 50.

Each clamp jaw 102 and 104 is further provided with a roller 136 which is pivotally secured by means of a roller pin 138 to a yoke 140 which is in turn fixedly secured to the outer end portion of the respective clamp jaw by means of a pair of threaded bolts 142. The rollers 136 are so positioned that they rollingly engage the rollers 128 carried by the roller mounting block 118 so that when the rollers 128 are moved radially inwardly relative to the axis of rotation of the dial plate 50 and the respective roller yokes 124 are rotated about their respective roller pins 126, the clamp jaws 102 and 104 are rotated about their respective eccentric bolts 106 away from the corresponding mandrel 54 by which they are positioned.

A spring retainer bracket 144 is fixedly secured to the dial plate 50 at the circumferential outer surface 120 thereof at a location equidistant between adjacent roller mounting blocks 118. Each spring retainer bracket 144 is fixedly secured to the dial plate by means of a pair of threaded bolts 146. A pair of threaded studs 148 are fixedly secured in each spring retainer bracket 144 and extend respectively outwardly therefrom toward a respective yoke 140 of an adjacent clamp jaw. A compression coil spring 150 is positioned about each stud 148 and extends from an adjusting nut 152 threadedly engaged on the respective stud 148 into engagement with the adjacent yoke 140. Each coil spring 150 is received about a protuberance 154 extending from the yoke 140 toward the adjacent spring retainer bracket 144 in generally coaxial alignment with the corresponding stud 148. The compression coil spring 150 yieldably urges the clamp jaw structure engaged thereby toward the respective mandrel 54 adjacent the clamp jaw. Each stud 148 and cooperating threaded nut 152 provides means for adjusting the spring pressure urging the corresponding clamp jaw toward the corresponding mandrel. The clamp jaws 102 and 104 are provided with corresponding chamfered outer edge portions 156 and 158 which minimize the possibility of any foreign material causing a jam between adjacent clamp jaws during operation of the apparatus 10.

Actuation of the clamp jaws 102 and 104 about each of the respective mandrels 54 is achieved by means of a suitable cam structure carried by the tool mounting plate 16 which sequentially engages the cam rollers 128 as the dial plate 50 is indexed about its rotational axis by the automatic indexer assembly 24. The cam structure of the apparatus 10 is best illustrated in FIGS. 1, 2, 6 and 20. The cam structure comprises closure ejecting roller ramp 160 mounted on the upper surface of the tool mounting plate 16 intermediate the grooving station 700 and the closure ejecting station 800 and positioned proximate to the circumferential outer surface 120 of the dial plate 50. The closure ejecting roller ramp 160 is secured to the tool mounting plate 16 by suitable means such as threaded bolts 162. The cam structure further includes an ejecting cam 164 positioned contiguous to the closure ejecting roller ramp 160 and extending beneath the closure ejecting station 800. The ejecting cam 164 is provided with a concave arcuate inner face confronting the circumferential outer surface 120 of the dial plate 50. The ejecting cam 164 is secured to the tool mounting plate 16 by suitable means such as threaded bolts 162. The cam structure further includes a pair of substantially identical intermediate cams 166 also fixedly secured to the tool mounting plate 16 by suitable means such as threaded bolts 162. The intermediate cams 166 are each provided with a concave arcuate surface confronting the circumferential outer surface 120 of the dial plate 50 with one of the intermediate cams 166 contiguous with the exit cam 164 at one end thereof and at the opposite end thereof contiguous with the other intermediate cam 166. The cam structure also includes an input cam 168 fixedly secured to the tool mounting plate 16 by suitable means such as threaded bolts 162 and also having a concave generally arcuate inwardly facing surface confronting the circumferential outer surface 120 of the dial plate 50. One end of the input cam 168 is contiguous with a second end of the adjacent intermediate cam 166. The input cam 168 extends beneath the ring feed station or mechanism 200. The positioning of the closure ejecting roller ramp 160 and cam 164, 166 and 168 provides a substantially continuous arcuate concave inwardly facing surface which extends about the circumferential outer surface 120 of the dial plate 50 from a position intermediate the grooving station 700 and closure ejecting station 800 to a position intermediate the ring feed station 200 and disc feed station 300. It is preferred to include in the cam structure a continuous cam roller track 170 which is fixedly secured to and extends along the concave generally arcuate inwardly facing surface defined by the cams 164, 166 and 168.

The configuration of the closure ejecting roller ramp 160 and the cams 164, 166 and 168 causes the clamp jaws 102 and 104 associated with each mandrel 54 to be pivoted away from engagement with the respective mandrel as the mandrel is indexed by the drive plate from a position intermediate the grooving station 700 and the closure ejecting station 800 to a position in registration with the closure ejecting station 800. The clamp jaws 102 and 104 are maintained in this open or separated position relative to the respective mandrel 54 by the mutual action of the cam structure and the cam rollers 128, roller yokes 124 and cam rollers 136 through continued indexing of the dial plate 50 until the respective mandrel 54 is indexed to a position intermediate the ring feed station 200 and the disc feed station 300. It should be understood at this point that all incremental rotation or indexing of the dial plate 50 is in a clockwise direction as viewed in FIG. 2 and as indicated by the arrow 172.

The apparatus 10 is further provided with a limit switch LS2 mounted on the tool mounting plate 16 adjacent the ring feed station 200. The limit switch LS2 is provided with an actuator arm 174 which extends to a position directly over each mandrel 54 which is stopped adjacent the ring feed station 200 for the predetermined time period of dwell during the indexing of the dial plate 50. The limit switch LS2 senses by means of the actuator 174 the presence of a generally cylindrical ring on the mandrel 54 adjacent thereto for suitable control purposes which will be described in detail hereinafter. Similarly, the apparatus 10 includes a limit switch LS7 mounted on the tool mounting plate 16 at a position intermediate the closure ejecting station 800 and the ring feed station 200. The limit switch LS7 is provided with an actuator 176 which is positioned to extend over each of the mandrels 54 which revolve thereunder on the dial plate 50 so as to sense the presence of a non-ejected ring-type closure on a mandrel 54 for suitable control purposes as will also be described in detail hereinafter.

An emergency stop button PB2 is mounted on the lower central portion of the operator consolet 78, and a second emergency stop button PB3 is mounted on the apparatus 10 at a position opposite the stop button PB2 and adjacent the curling station 650. The operation of the emergency stop buttoms PB2 and PB3 will be explained in detail hereinafter.

Figure 11:
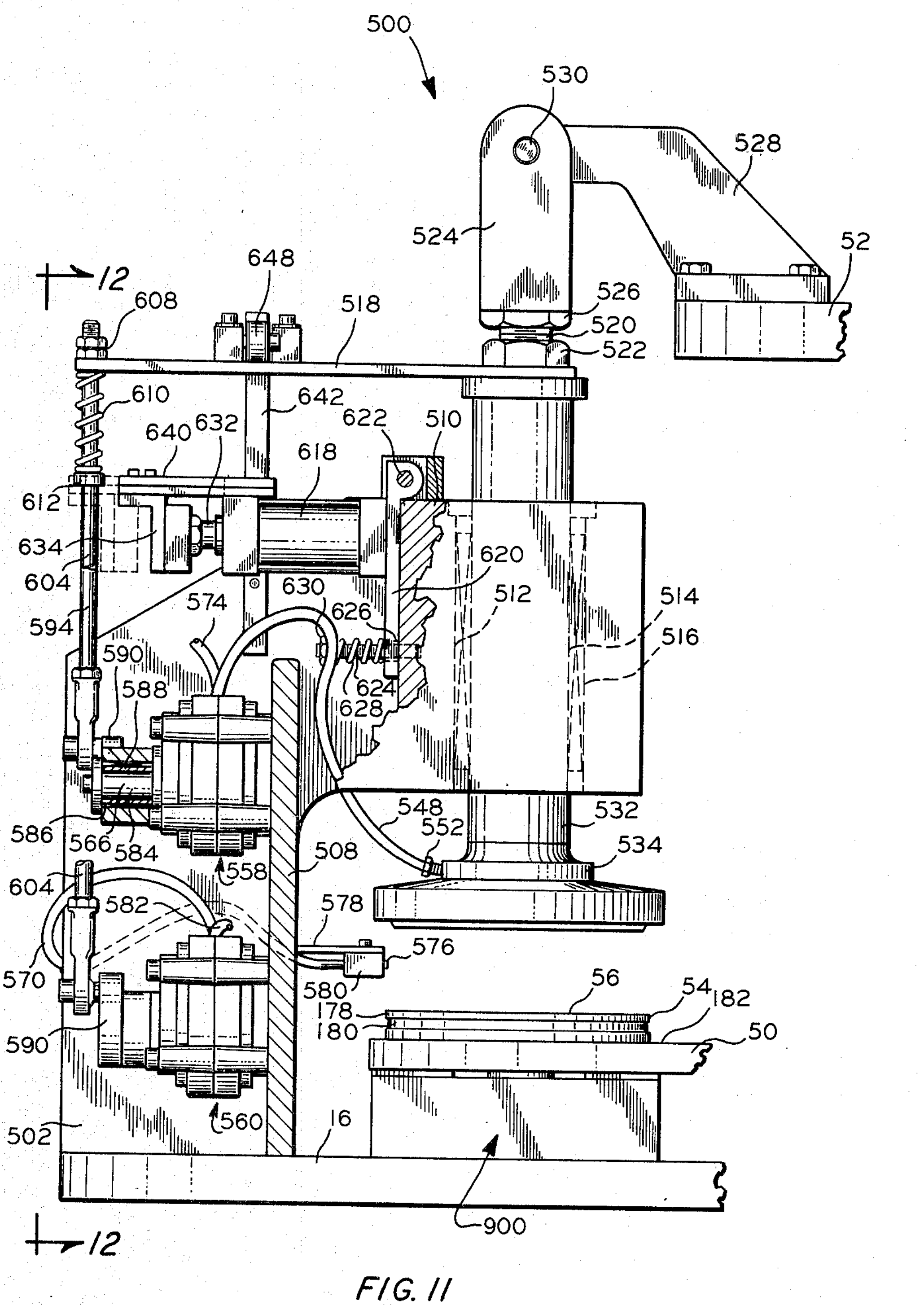
FIG. 11 is an enlarged fragmentary view taken along line 11—11 of FIG. 2 illustrating construction details of the adhesive dispensing station.

As perhaps best shown in FIG. 11, each mandrel 54 on the dial plate 50 has a generally cylindrically shaped vertical outer surface 178 which is interrupted by a generally cylindrically shaped circumferential peripheral groove 180 formed in the outer surface 178 intermediate the top surface 56 of the mandrel and the top surface 182 of the dial plate 50. The portion of the vertical outer surface 178 intermediate the circumferential groove 180 and the top surface 182 of the dial plate 50 is preferably characterized by a roughened exterior which may be suitably formed thereon by a series of vertical grooves or serrations or by any other suitable means such as knurling. The roughened portion of the vertical outer surface 178 facilitates the engagement of a generally cylindrical ring on each mandrel 54 by the corresponding clamp jaws 102 and 104 whose jaw faces 108 and 110 confront the roughened portion of the vertical outer surface 178.

Figure 7:
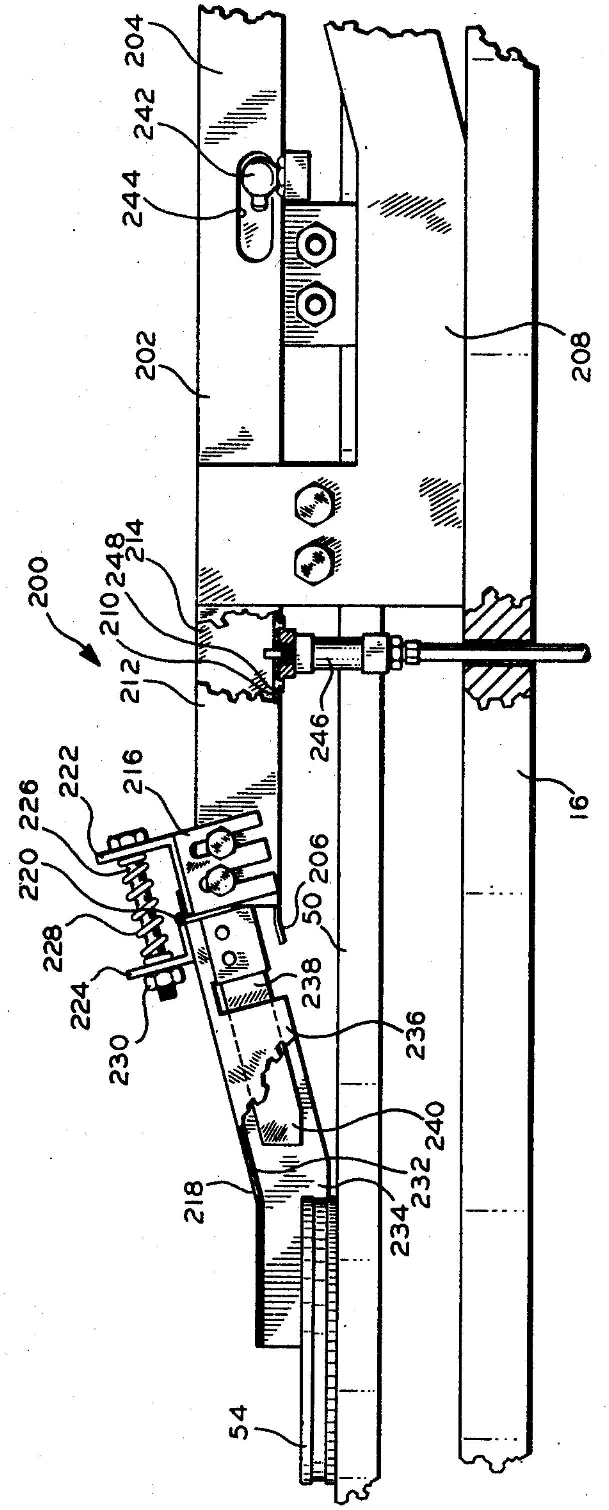
FIG. 7 is an enlarged fragmentary view taken along line 7—7 of FIG. 2 illustrating construction details of the ring feed station with portions broken away to facilitate understanding.

The ring feed station or mechanism 200 is best illustrated in FIGS. 2 and 7. The ring feed station 200 includes a ring input trough 202 having an inlet portion 204 and an outlet portion 206, the ring input trough being mounted on the tool mounting plate 16 by means of a ring feed support frame or bracket 208. The trough 202 comprises a generally flat bottom plate 210 and opposite upwardly extending sidewalls 212 and 214. A ring wiper adjusting bracket 216 is fixedly secured to the outlet portion 206 of the ring input trough 202 and a ring wiper 218 is pivotally secured to the adjusting bracket 216 by means of a hinge mechanism 220 which permits the ring wiper 218 to pivot relative to the adjusting bracket 216 about a horizontal axis. The adjusting bracket 216 includes an upwardly extending flange 222 while the ring wiper 218 includes a corresponding upwardly extending flange 224. A threaded bolt 226 extends through and mutually interconnects the flanges 222 and 224. A compression coil spring 228 is disposed about the bolt 226 intermediate the flanges 222 and 224 and biases the ring wiper 218 downwardly about the hinge mechanism 220 relative to the ring input trough 202. The maximum downward deflection of the ring wiper 218 relative to the ring input trough 202 is adjusted by a threaded nut 230 threadedly engaged with the bolt 226. The ring wiper 218 is characterized by a substantially horizontal top plate 232 and opposite side walls 234 and 236 extending downwardly therefrom. A ring locating guide in the form of a spring retainer 238 is mounted on the inside of the sidewall 236 and is so positioned as to gently grip at the outer end portion 240 thereof each generally cylindrical ring passing therethrough prior to engagement of the generally cylindrical ring on a mandrel 54 passing thereunder as the dial plate 50 is indexed from one dwell position to the next dwell position. A plurality of air jets 242 are positioned in staggered spaced relation along the side walls 212 and 214 of the ring input trough 202 and are aligned so as to direct the air streams emanating therefrom through corresponding slots 244 formed in the respective side walls 212 and 214 generally toward the outlet portion 206 of the trough 202. An air cylinder 246 is mounted directly below the bottom plate 210 of the ring input trough 202 with the rod end thereof extending upwardly and adapted to pass through an aperture 248 formed in the bottom plate 210 when the cylinder 246 is activated into its extended position. The rod end of the air cylinder 246 is withdrawn below the plane of the bottom plate 210 when the air cylinder 246 is activated to its retracted position. The air cylinder 246 provides means for halting the introduction of generally cylindrical rings to the dial plate through the ring feed station 200 upon the receipt of an appropriate signal from elsewhere in the apparatus 10 as will be described more fully hereinafter.

The disc feed station or mechanism 300 is best illustrated in FIGS. 1, 2, 8, 9, 10 and 10A. The disc feed station includes a disc feed support frame 302 mounted on the disc feed pedestal 68. The support frame 302 includes a pair of vertically oriented side plates 304 and 306, a forming cylinder mounting plate 308 extending between and fixedly secured to the side plates 304 and 306, a front plate 310 extending between and fixedly secured to the side plates 304 and 306, a horizontal plate or shoe 312 extending between and fixedly secured to the side plates 304 and 306 and further secured to the front plate 310, a gauge bar stop 314 extending horizontally between and fixedly secured to the side plates 304 and 306, and a power cylinder mounting plate 316 extending horizontally between and fixedly secured to the side plates 304 and 306. Four disc stacking rod holders 318 are fixedly secured to and extend inwardly from respective side plates 304 and 306. The rod holders 318 secure two pairs of disc stacking rods 320 and 322 in mutually parallel vertical alignment. The rods 320 and 322 are horizontally spaced one from the other so as to define a vertical column or chute in which a stack of generally circular discs for use in the assembly of ring-type closures can be positioned for automatic feed by the disc feed station 300 onto successive mandrels 54 on the dial plate 50 during operation of the apparatus 10. Disc stack separators 324 and 326 are positioned respectively on the disc stacking rods 320 and 322 to support at least a portion of the weight of the column of generally circular discs positioned between the rods 320 and 322 above the respective disc stack separators.

A disc carriage 328 is slidingly supported on a pair of horizontally spaced, parallel guide rods 330 which extend between and are fixedly secured at their opposite ends to the power cylinder mounting plate 316 and to the gauge bar stop 314. The disc carriage 328 is supported on each of the guide rods 330 by means of a pair of suitable sliding bearings 332 such as ball bushings. The guide rods 330 are aligned so as to permit reciprocating movement of the disc carriage 328 thereon along a line normal to the axis of rotation of the dial plate 50. Reciprocation of the disc carriage 328 on the guide rods 330 is performed by a suitable power cylinder 334 mounted on the power cylinder mounting plate 316 with the rod end thereof secured by means of a rod eye 336 and pin 338 to a downwardly extending tongue 340 formed on the lower portion of the disc carriage 328. A suitable power cylinder 334 for this application is designated as a Tom Thumb air cylinder Model No. AVCF $1\frac{1}{8}\times 1$P. A chipper plate 342 is mounted on the horizontal top surface of the disc carriage 328 and is provided with a horizontal recess 344 formed therein conforming to at least a portion of the outline of a generally circular disc to be fed thereby. The depth of the recess 344 below the upper surface 346 of the chipper plate 342 is preferably slightly less than the nominal thickness of each of the generally circular discs to be fed thereby whereby horizontal reciprocation of the disc carriage 328 and chipper plate 342 will cause the horizontal displacement of the lowermost disc from the disc stack thereabove along the line of movement of the disc carriage 328 toward the dial plate 50. A plurality of apertures 348 extend through the chipper plate 342 in horizontally spaced relation adjacent the juncture between the recess 344 and the upper surface 346 of the chipper plate. A passage 350 formed in the disc carriage 328 communicates between the aperture 348 and a suitable fitting 352 threadedly secured in the passage 350. The fitting 352 is connected by means of a suitable conduit 354 to a suitable source of vacuum, preferably the vacuum pump 22 of the apparatus 10. Vacuum applied through the apertures 348 via the passage 350, fitting 352, conduit 354 and vacuum pump 22 serves to firmly draw the trailing edge portion of each disc into firm contact with the recess 344 adjacent the juncture between the recess 344 and the upper surface 346 to assure firm contact between the vertical wall between the recess 344 and upper surface 346 and the trailing edge of each disc as the disc is being transferred toward the dial plate 50.

A pair of gauge bars 356 are mounted respectively on the two lowermost disc stacking rod holders 318 by suitable means such as threaded bolts 358. The gauge bars 356 are vertically positioned relative to both the disc carriage 328 and the gauge bar stop 314 such that the lowermost edge 360 of each gauge bar will permit the passage of the lowermost disc thereunder in response to horizontal movement of the disc carriage 328 and chipper plate 342 while blocking similar movement of the disc next above to thereby achieve sequential feeding of the disc from the bottom of the stack by the mechanism 300.

A lower roller drive shaft 362 extends between and is journaled at the opposite ends thereof in a pair of suitable bearings 364 mounted respectively in the side plates 304 and 306. A driven sprocket 366 is drivingly secured to one end of the drive shaft 362 and is in turn connected by a suitable drive chain 368 to a drive sprocket 370 on the output shaft of a speed reducer 372 which is in turn drivingly engaged with an electric drive motor 374. A knurled outer cylinder 376 is drivingly secured to the drive shaft 362 by suitable means such as a set screw. An upper roller shaft 378 is aligned parallel to and positioned directly above the drive shaft 362 with the square opposite end portions thereof each received in a rectangular slot 380 formed in a corresponding mounting block 382. A knurled upper roller 384 is journaled on the upper roller shaft 378 by means of needle bearings 386. The upper roller shaft 378 is biased downwardly to maintain predetermined contact pressure between the upper roller 384 and the outer cylinder 376 by means of a compression coil spring 388 interposed between each end of the shaft 378 and a corresponding threaded bolt 390 which is threadedly engaged in the corresponding mounting block 382. Each bolt 390 is locked in proper position by means of a jam nut 392 threaded on the bolt 390. The mounting blocks 382 are supported respectively on a pair of disc guides 394 which are in turn fixedly secured to the inside walls of the corresponding side plates 304 and 306. The mounting blocks 382 are fixedly secured to the top sides of a pair of parallel disc tracks 396 which are mounted on the top sides of corresponding disc guides 394 and provide lateral guidance for the generally circular discs as they are moved toward the dial plate 50 by the disc carriage 328. A pair of guide blocks 398 are mounted respectively on the inner walls of the side plates 304 and 306 with the upper surfaces thereof positioned a precise distance below the lower edge 360 of a respective gauge bar 356 positioned thereabove to support the lowermost disc of the disc guide passing therebetween as it is fed by the disc carriage 328.

Figure 8:
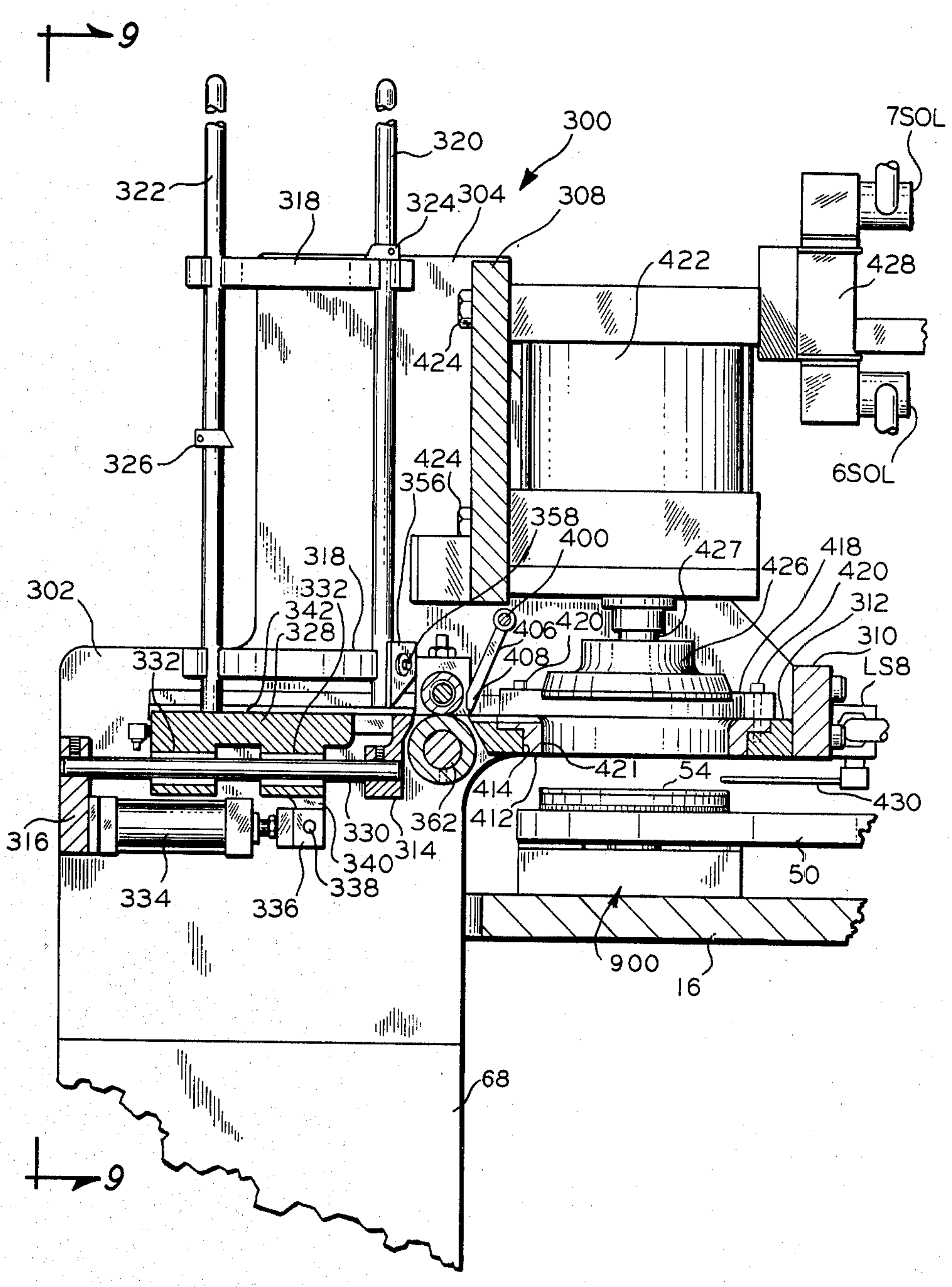
FIG. 8 is an enlarged fragmentary cross-section taken along line 8—8 of FIG. 2 illustrating construction details of the disc feed station.
Figure 9:
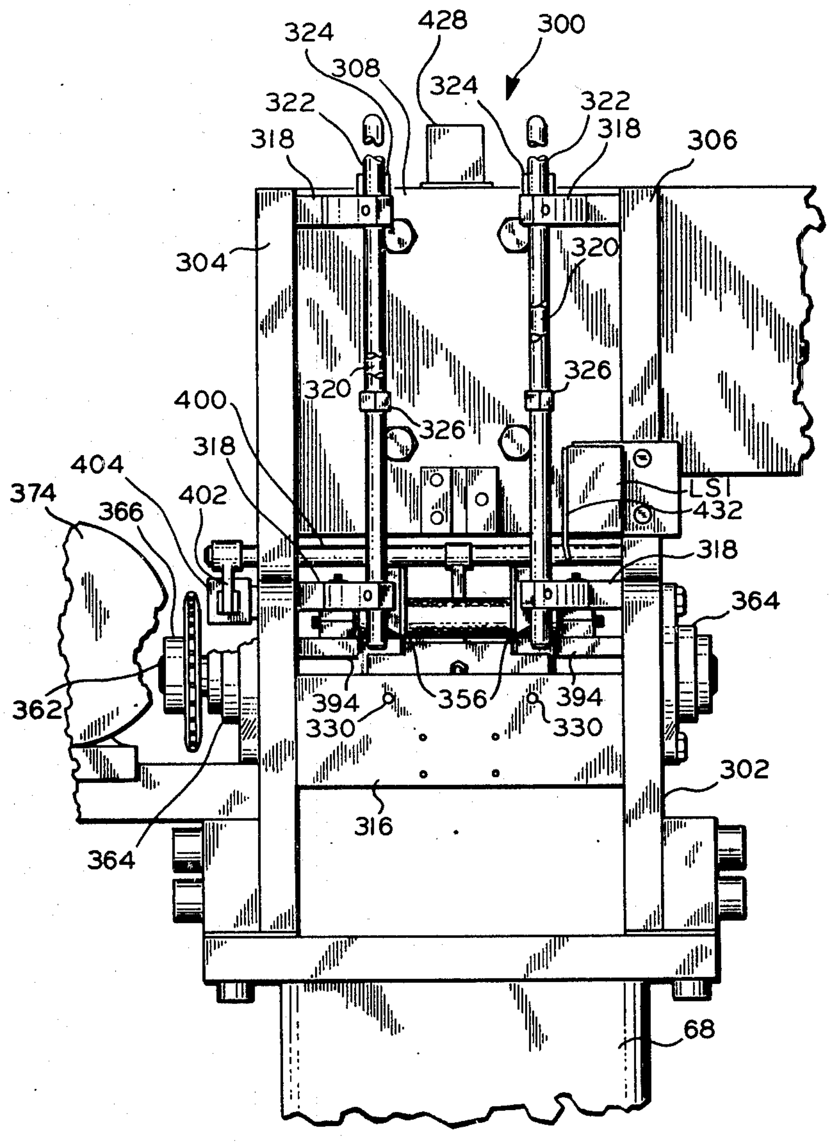
FIG. 9 is an enlarged fragmentary view taken along line 9—9 of FIG. 8.
Figures 10, 10A:
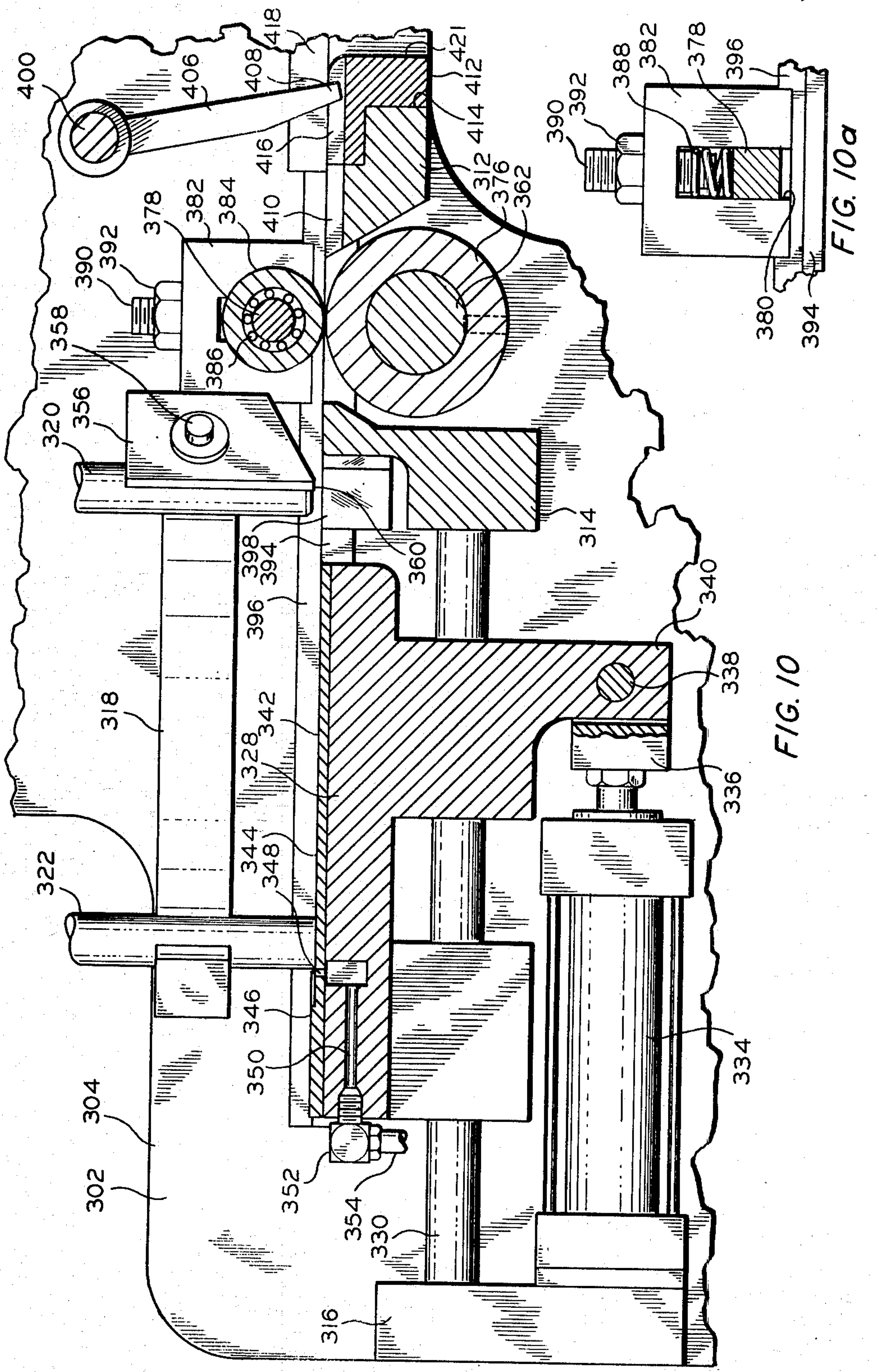
FIG. 10 is a further enlarged fragmentary vertical cross-section taken along the center line of the disc carriage and power cylinder.
FIG. 10A is an enlarged elevation view illustrating the construction details of the upper roller shaft mounting block.

A rake shaft 400 extends between and is journaled at the opposite ends thereof in the side plates 304 and 306 in suitable bearings. A crank arm 402 is drivingly secured at one end thereof to one end portion of the rake shaft adjacent the exterior of the side wall 304. The opposite end of the crank arm 402 is pivotally secured to the rod end of a power cylinder 404 which is mounted on the outer side of the side plate 304. The power cylinder is preferably an air cylinder. A rake arm 406 is drivingly secured at one end thereof to the medial portion of the shaft 400 intermediate the side plates 304 and 306. The lower end portion 408 of the rake arm 406 is adapted to revolve with the shaft 400 from a first position as illustrated in FIG. 8 when the power cylinder 404 is in its extended position to a second position as illustrated in FIG. 10 when the power cylinder is in its retracted position. The lower end portion 408 of the rake arm 406 is received in a corresponding slot 410 in the shoe 312. A disc forming die 412 is received in a corresponding aperture 414 in the shoe 312. The slot 410 of the shoe 312 communicates with and is positioned in registration with a similar slot 416 in the disc forming die 412 through which the lower end portion 408 of the rake arm 406 is also free to pass as shown in FIG. 10. It is the function of the rake arm 406 to engage the trailing edge of each disc which is thrust by the rotating nip roll structure comprising the driven knurled outer cylinder 376 and knurled upper roller 384 to assure that the disc is moved the full predetermined distance toward the dial plate 50. A U-shaped disc track stop 418 extends 180° around the disc forming die 412 with the open end thereof facing radially outwardly from the axis of rotation of the dial plate 50. The disc track stop 418 and the disc forming die 412 are fixedly secured to the shoe 312 by means of a plurality of threaded bolts 420. The disc forming die 412 is provided with a generally cylindrical aperture 421 having a diameter less than the diameter of the generally circular discs and approximately equal to the inside diameter of the generally cylindrical rings into which the generally circular discs are to be positioned in the assembly of the ring-type closures.

A disc forming power cylinder 422 is mounted on the forming cylinder mounting plate 308 by means of a plurality of threaded bolts 424. The rod end of the power cylinder 422 extends vertically downwardly from the power cylinder and is coaxially aligned with the aperture 421 of the disc forming die 412. A disc forming punch 426 is fixedly secured to the power cylinder rod 427 and is provided with a circular face which is sized and shaped to be closely received within the aperture 421 of the disc forming die 412 so as to force one of said generally circular discs downwardly through the aperture 421 to form an upwardly extending skirt about the periphery of the disc and positioned disc within the circular open upper end of a generally cylindrical ring on a mandrel 54 positioned below and coaxially aligned with aperture 421 when the dial plate 50 is in the dwell position for a predetermined time. The power cylinder 422 is preferably an air cylinder, a suitable air cylinder for this purpose being a Schrader Series A, 250 psi cylinder with POW-AIR-PAC and having a bore of 6 inches and a stroke of 2½ inches. The cylinder 422 is provided with a control valve assembly 428 comprising a "punch-down" solenoid 7SOL and a "punch-up" solenoid 6SOL. The solenoids 6SOL and 7SOL control the application of air to the rod and piston ends of the cylinder 422 in response to suitable controls as will be described in greater detail hereinafter.

A limit switch LS8 is mounted on the front plate 310 and is provided with an actuator 430 which extends therefrom to a position slightly over the path traversed by each generally cylindrical ring on a mandrel 54 as the mandrel 54 is indexed from a position adjacent the disc feed station 300 toward the adhesive dispensing station 500 so that the normally open limit switch LS8 is closed when the mandrel 54 passing thereby is carrying a generally cylindrical ring thereon. The closed switch LS8 provides a signal to the control system which enables the apparatus 10 to dispense adhesive at the adhesive dispensing station 500 and to provide lubricant to the generally cylindrical ring passing thereby prior to the curling operation at the curling station 650.

The disc feed station 300 is further provided with a limit switch LS1 mounted on the side plate 306 and having an actuator 432 adapted to contact the outer surface of a stack of generally circular disc carried within the disc stacking rods 320 and 322. When a sufficient number of discs are present in the stack, the normally closed switch LS1 is maintained in the open position by the discs in the stack bearing against the actuator 432. When an insufficient amount of discs are present adjacent the limit switch LS1, the limit switch closes thereby sending a signal to the control system as will be described in greater detail hereinafter.

Figure 12:
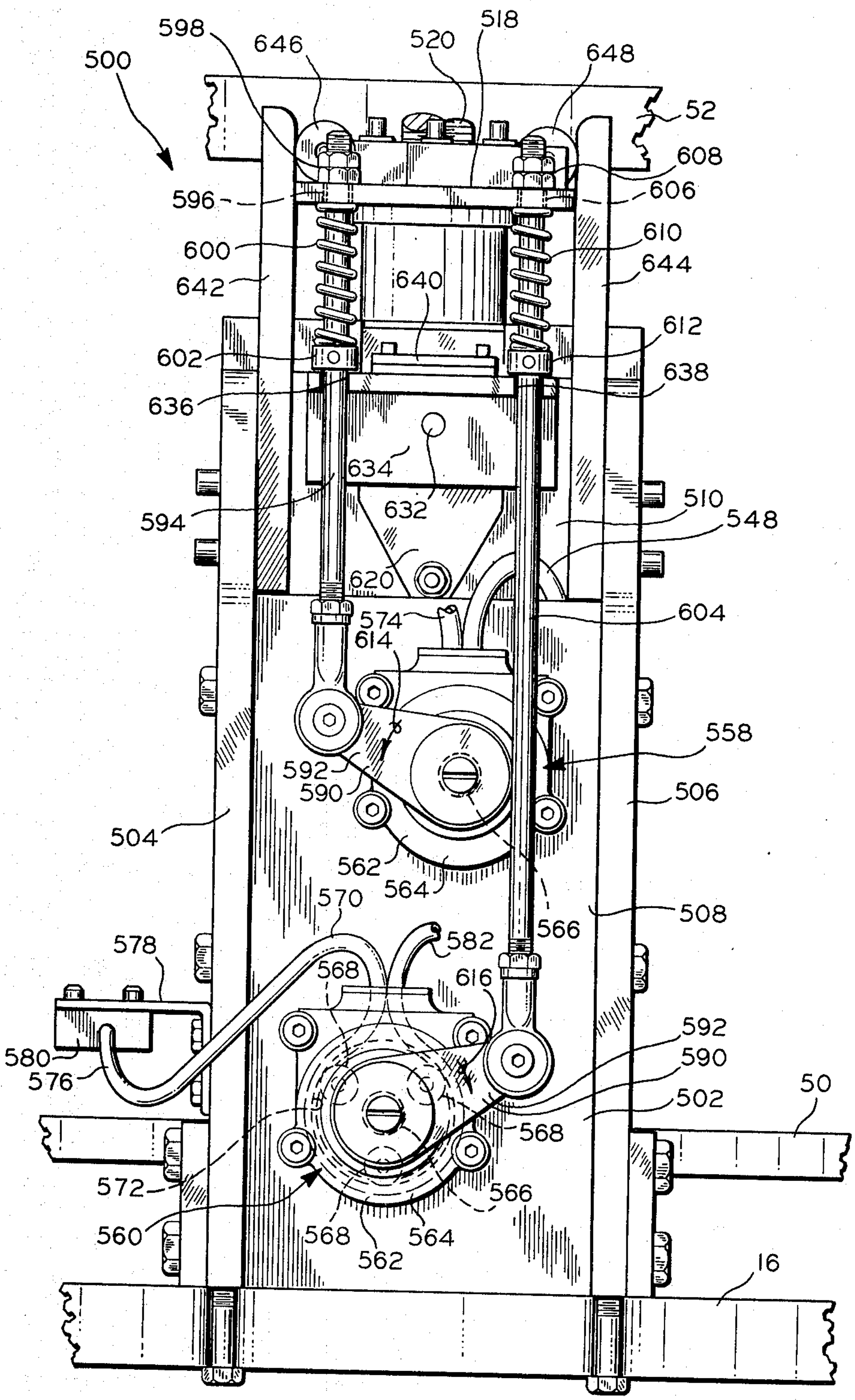
FIG. 12 is an enlarged fragmentary view taken along line 12—12 of FIG. 11.
Figure 13:
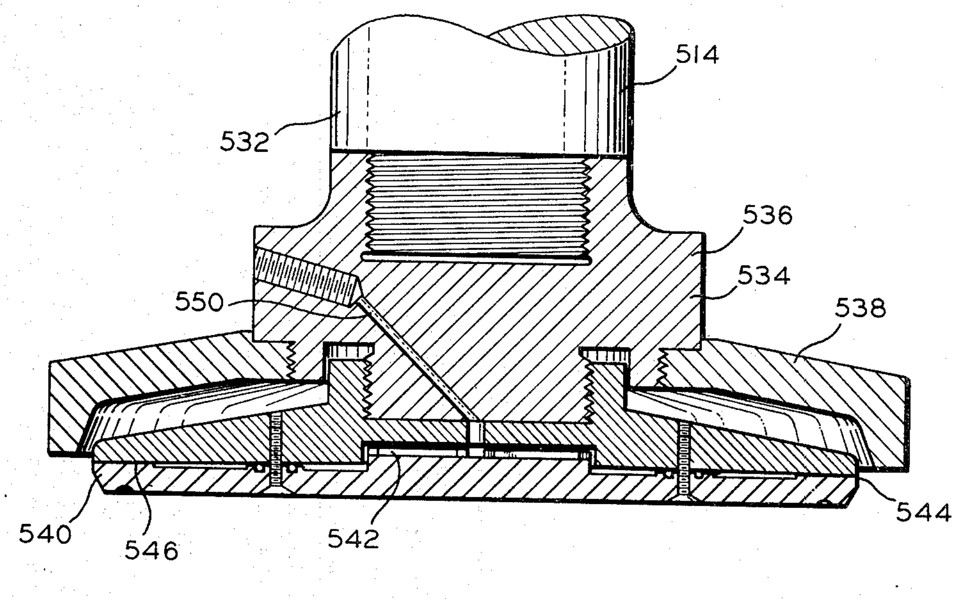
FIG. 13 is a further enlarged vertical cross-section taken along the center line of the adhesive dispensing head assembly.

The adhesive dispensing station 500 is best illustrated in FIGS. 1, 2, 11, 12, 13 and 14. The adhesive dispensing station comprises an adhesive dispensing support frame 502 which includes a pair of side plates 504 and 506 fixedly secured to and extending upwardly from the tool mounting plate 16. A pump mounting plate 508 extends between and is fixedly secured to the side plates 504 and 506. A shaft mounting block 510 also extends between the side plates 504 and 506 and is fixedly secured thereto. The shaft mounting block 510 is provided with a vertically aligned passage 512 extending therethrough in coaxial alignment with each mandrel 54 positioned therebelow when the dial plate 50 is in the dwell position for a predetermined time. A vertically reciprocatable shaft 514 is positioned within the passage 512 and is supported therein by means of a suitable ball bushing 516 to facilitate the vertical reciprocation of the shaft 514 within the mounting block 510. A pump linkage brace 518 is fixedly secured to the threaded upper end portion 520 of the shaft 514 by means of a threaded jam nut 522. A clevis 524 is threadedly secured to the upper end portion of the shaft 514 and is locked thereto by a second jam nut 526. The clevis 524 is pivotally secured to an eye actuator bracket 528 which is fixedly secured to the reciprocatable platen 52 by means of a pivot pin 530. The lower end portion 532 of the shaft 514 is threadedly secured to an adhesive or glue head dispenser assembly 534. The adhesive dispenser head assembly 534 is best illustrated in FIG. 13 and comprises a central hub 536, a head forming-wipe 538 threadedly secured to the hub 536, and an adhesive dispenser subassembly 540 threadedly secured to the hub 536. The subassembly 540 defines an adhesive dispensing cavity 542 which communicates with the circumferential periphery 544 of the subassembly 540 via a plurality of radially extending capillary passages 546 through which adhesive is dispensed at a predetermined time in a predetermined quantity onto the inner surface of a generally cylindrical ring in the assembly of ring-type closures. The cavity 542 is in fluid flow communication with an adhesive supply conduit 548 via a passage 550 in the hub 536 and a fitting 552 which is threadedly secured in the passage 550. A plurality of apertures 554 extend between the lower and upper surfaces of the adhesive dispenser subassembly 540 and are each isolated from the adhesive dispensing cavity 542 by means of a suitable resilient annular seal 556, such as a rubber O-ring, disposed about each of the apertures 554 at its intersection with the cavity 542. The apertures 554 provide pressure relief to prevent the creation of a vacuum between the adhesive dispenser subassembly 540 and a generally circular disc in a partially assembled ring-type closure upon the upward movement of the subassembly 540 subsequent to the dispensing of adhesive within the corresponding generally cylindrical ring. The interior surface of the head forming-wipe 538 is sized and shaped so as to urge the upper portion of the wall of each generally cylindrical ring in which the adhesive is dispensed radially inwardly so as to assure that the adhesive is satisfactorily distributed on the inner surface of the ring during both adhesive dispensing and during upward movement of the adhesive dispenser subassembly 540 after the dispensing of a predetermined amount of adhesive. The head forming-wipe 538 is preferably provided with at least one aperture communicating between the upper and lower surfaces thereof (not shown) to provide pressure relief to prevent the creation of a vacuum between the head forming-wipe 538 and a partially assembled closure upon upward movement of the head forming-wipe relative to such closure.

An adhesive or glue pump assembly 558 and a lubricant pump assembly 560 are each mounted on the pump mounting plate 508. Each of the pump assemblies 558 and 560 comprises a flexible tube pump 562 mounted on the pump mounting plate 508 by suitable means such as threaded bolts. A suitable flexible tube pump for use in the present invention is available from Cole-Parmer Instrument Company, Chicago, Illinois, and is identified by the trademark Masterflex, and is generally designated by the standard pump head number 7014. Each pump 562 comprises a housing 564 which is fixedly secured to the pump mounting plate 508 by means of the previously mentioned four threaded bolts. A rotor 566 is journaled in each housing 564 and carries three compression rollers 568 journaled thereon, as best shown in FIG. 12. Each rotor 566 and the three compression rollers 568 associated therewith comprise what may be referred to as a pressure member. A length of flexible tube 570 is routed through the housing 564 of the lubricant pump assembly 560, while the previously mentioned adhesive supply conduit 548, in the form of a flexible tube, is routed through the housing 564 of the adhesive pump assembly 558. Each of the flexible tubes 570 and 548 forms a substantially circular loop within the respective housing 564 intermediate the compression rollers 568 and a circular inner surface 572 formed in each of the housings 564. Each loop is substantially coaxial with the axis of rotation of the corresponding rotor 566. The outlet end portion of the adhesive supply conduit 548 is secured in fluid flow communication with the previously described fitting 552 on the adhesive dispenser head assembly 534, while the inlet end portion 574 is placed in fluid flow communication with a suitable source of liquid adhesive to be dispensed by the adhesive dispensing station 500. The outlet end portion 576 of the flexible tube 570 is supported over the dial plate 50 by means of a lubricant tube bracket 578 mounted on the side plate 504 and a lubricant tube clamp 580 mounted on the bracket 578. The inlet portion 582 of the tube 570 is placed in fluid flow communication with a suitable source of liquid lubricant to be dispensed in conjunction with the operation of the adhesive dispensing station 500. A suitable tube for use with each of the pump assemblies 558 and 560 is available from Cole-Parmer Instrument Company, is sold under the trademark Tygon, and has an inside diameter of about 0.065 inch (1.66 mm) and an outside diameter of about 0.1945 inch (4.94 mm).

Each rotor 566 includes an input shaft 584 the outer end portion of which is provided with a transverse drive slot formed therein. A one-way clutch assembly 586 is coaxially positioned about each input shaft 584. A suitable one-way clutch assembly for use in each of the pump assemblies 558 and 560 is available from the Torrington Bearing Company, Torrington, Connecticut, and is designated as a drawn cup clutch and bearing assembly, type RCB121616. Interposed between each one-way clutch assembly 586 and the corresponding input shaft 584 is a tubular sleeve 588, also available from the Torrington Bearing Company. Each tubular sleeve 588 is provided with a transverse drive slot formed in one end thereof and positioned in registration with and drivingly keyed to the previously mentioned transverse drive slot of the corresponding input shaft 584 by means of a drive key secured to the input shaft by suitable means such as a threaded bolt. A pump lever 590, having a hub with a bore therethrough, is drivingly secured to each of the one-way clutch assemblies 586 by suitable means, such as a press fit between the bore of the hub and the outer race or cup of the one-way clutch assembly 586. Each pump lever 590 further includes a rigid member or arm 592 which extends radially outwardly from the hub and is adapted to be connected to suitable actuating means as will be described in detail hereinafter. The outer end portion of the rigid member 592 of the adhesive pump assembly 558 is pivotally secured to the lower end portion of a rigid actuating member or link 594, the upper end portion of which extends through and is slidably received in an aperture 596 formed in the pump linkage brace 518. The upper end portion of the link 594 is restrained from downward movement through the aperture 596 by means of a threaded nut and threaded jam nut secured to the upper end portion of the link as shown at 598. A compression coil spring 600 is disposed about the link 594 intermediate the pump linkage brace 518 and a collar 602 which is fixedly secured to the link 594 intermediate the spring 600 and the roller end portion of the link.

In a similar manner, a second rigid actuating rod or link 604 is pivotally secured at the lower end portion thereof to the outer end portion of the rigid member 592 of the lubricant pump assembly 560. The upper end portion of the link 604 extends through and is slidably received in an aperture 606 formed in the pump linkage brace 518. The upper end portion of the link 604 is restrained from downward movement through the aperture 606 by means of a threaded nut and jam nut threadedly secured to the upper end portion of the link 604 as illustrated at 608. A compression coil spring 610 is disposed about the link 604 intermediate the pump linkage brace 518 and a collar 612 which is disposed about and fixedly secured to the link 604 intermediate the pump linkage brace 518 and the rigid member 592 of the lubricant pump assembly 560.

During operation of the adhesive dispensing station 500, the adhesive pump assembly 558 and lubricant pump assembly 560 are actuated simultaneously by the vertical reciprocation of the platen 52 acting through the actuator bracket 528, pivot pin 530, clevis 524, shaft 514, pump linkage brace 518, compression coil springs 600 and 610, collars 602 and 612 and rigid actuating links 594 and 604. As mentioned earlier, the platen 52 performs a single reciprocation from a first position distal from the dial plate 50 to a second position proximate to the dial plate 50 and back to the first position during each dwell period of a predetermined time of the dial plate 50. The downward movement of the platen 52 from its first position to its second position causes resulting downward movement of the rigid actuating links 594 and 604 which in turn drive the respective rigid members 592 of the adhesive pump assembly 558 and lubricant pump assembly 560 downwardly relative to the respective input shafts 584 of the respective pump rotors 566 thus rotating the rotor 566 of the adhesive pump assembly 558 through a predetermined angle about the axis of rotation of the rotor in a counterclockwise direction as viewed in FIG. 12 and as shown by the arrow 614, and rotating the rotor 566 of the lubricant pump assembly 560 through a predetermined angle about the axis of rotation of the second mentioned rotor in a clockwise direction as viewed in FIG. 12 and as shown by the arrow 616. These rotations of the rotors 566 are achieved via the respective one-way clutch assemblies 586 which lock the respective pump levers 590 to the respective tubular sleeves 588, which sleeves are in turn keyed to the respective input shafts 584 of the respective rotors 566. The rotation of the rotor 566 of the adhesive pump assembly 558 forces a predetermined amount of liquid adhesive through the flexible tube or conduit 558 and out the outlet end portion thereof and through the adhesive dispenser head assembly 534 onto the desired inner surface of the generally cylindrical ring of a partially assembled container positioned adjacent the adhesive dispensing station on a respective mandrel 54. The rotation of the rotor 566 of the lubricant pump assembly 560 forces a predetermined amount of liquid lubricant through the flexible tube 570 and out the outlet end portion 576 thereof to form a small mass or drop of lubricant temporarily supported on the outlet end portion 576 which is wiped on the upper outer surface of a generally cylindrical ring as it is indexed by the dial plate 50 from a position adjacent the adhesive dispensing station 500 to a position adjacent the curling station 650. Upward movement of the rigid actuating links 594 and 604 permits the clockwise rotation of the pump lever 590 of the adhesive pump assembly 558 and counterclockwise rotation of the pump lever 590 of the lubricant pump assembly 560, which pump levers have both been released by the action of the respective one-way clutch assemblies 586 from the input shafts 584 of the respective rotors 566. The compression coil springs 600 and 610 provide yieldable shock absorber means between the pump linkage brace 518 and the pump levers 590 of the respective adhesive pump assembly 558 and lubricant pump assembly 560. It will be readily apparent that by suitably adjusting the positions of the nuts 598 and collar 602 on the rigid actuating link 594, the amount of adhesive dispensed upon each downward stroke of the pump linkage brace 518 can be precisely governed. Similarly, by suitably adjusting the positions of the nuts 608 and collar 612 on the rigid actuating link 604, the amount of liquid lubricant dispensed upon each downward stroke of the pump linkage brace 518 can also be precisely governed.

The adhesive dispensing station 500 is further provided with means for mechanically preventing the downward movement of the rigid links 594 and 604 responsive to downward movement of the pump linkage brace 518 when a generally cylindrical ring is not present on the mandrel 54 positioned proximate the adhesive dispensing station 500 during a well period of the dial plate 50. Such means comprises a suitable power cylinder 618 such as an air cylinder which is fixedly secured at the cylinder end thereof to a pump terminator mounting plate 620 which is pivotally secured at the upper end portion thereof to a horizontal hinge pin 622 which permits the pump terminator mounting plate 620 and power cylinder 618 to rotate in a clockwise direction about the hinge pin from the position shown in FIG. 11. A generally horizontally aligned threaded stud 624 extends through an aperture 626 formed in the lower end portion of the mounting plate 620 and is threadedly secured to the shaft mounting block 510. A compression coil spring 628 is disposed about the stud 624 intermediate the mounting plate 620 and an adjustable nut 630 threadedly secured to the outer end portion of the stud 624. The compression coil spring 628 yieldably biases the mounting plate 620 about the hinge pin 622 against the shaft mounting block 510.

The rod 632 of the power cylinder 618 is fixedly secured to a pump terminator angle bracket 634 which is provided with a pair of vertically oriented notches 636 and 638 positioned to engage the respective actuating links 594 and 604 when the rod 632 is extended by the power cylinder 628 as illustrated by the dashed lines in FIG. 11. When the rod 632 is retracted by the power cylinder 618 the pump terminator angle bracket 634 is completely withdrawn from the actuating links 594 and 604 as illustrated by the solid lines in FIG. 11. The pump terminator angle bracket 634 is prevented from rotating about the longitudinal axis of the rod 632 by means of a power cylinder rod guide assembly 640 which is fixedly secured to the pump terminator angle bracket 634 by suitable means such as threaded bolts and which is adapted to slide along the horizontal upper surface of the power cylinder body proximate to the rod 632. The guide assembly 640 is preferably constructed of a lower bronze guide bearing plate and an upper steel bearing plate.

It will be seen that upon the extension of the rod 632 with the platen 52 in its uppermost position, the notches 636 and 638 of the pump terminator angle bracket 634 are received about the actuating rods 594 and 604 beneath the respective collars 602 and 612 thus preventing the downward movement of the links 594 and 604 in response to downward movement of the platen 52 by overcoming the urging of the compression coil springs 600 and 610. In the event of extension of the rod 632 when the platen 52 is in its lower position, upward movement of the links 594 and 604 will cause clockwise rotation of the power cylinder 618 and pump terminator mounting plate 620 about the hinge pin 622 overcoming the urging of the compression coil spring 628 thus preventing the possibility of jamming of the adhesive dispensing mechanism.

Precise vertical positioning of the vertically reciprocating pump linkage brace 518 is provided by a pair of vertical guide bars 642 and 644 mounted respectively on the side plates 504 and 506 which are engaged by corresponding rollers 646 and 648 journaled on the pump linkage brace 518.

The curling station or mechanism 650 is best illustrated in FIGS. 1, 2, 15 and 16. The curling station 650 comprises a curling station pedestal 652 fixedly secured to the tool mounting plate 16. An electric drive motor 654 is mounted on a motor mount 656 which is pivotally secured to the pedestal 652 by means of a vertical hinge pin 658. A thimble 660 is journaled on the pedestal 652 by means of a pair of pillow block bearings 662 and is adapted to rotate about a vertical axis coaxial with the mandrel 54 carried by the dial plate 50 when the dial plate is in the dwell position for a predetermined period of time. A driven pulley 664 is drivingly secured to the upper end portion of the thimble 660 and is drivingly engaged with a suitable flexible endless drive member 666, such as a groove timing belt, which is drivingly engaged with the drive pulley 668 of the drive motor 654. A spindle 670 is vertically slidably received within the thimble 660 and is coaxially aligned with the rotational axis of the thimble. The upper end portion of the spindle 670 is secured in vertically sliding, splined relation with a corresponding drive nut 672 which is drivingly secured to the driven pulley 664 by suitable means such as a plurality of threaded bolts. The lower end portion of the spindle 670 is threadedly secured to a curling head 674. The thimble 660, spindle 670 and curling head 674 are adapted to rotate in unison in response to rotational motion applied thereto by the drive motor 654 via the drive pulley 668, drive belt 666 and driven pulley 664.

The upper end portion of the spindle 670 is rotatably secured in a suitable thrust bearing 676 mounted in a crimp type bearing housing 678, whereby the spindle 670 is adapted to rotate relative to the bearing housing 678. The bearing housing 678 is secured to the reciprocatable platen 52 by means of a vertically adjustable screw jack mechanism 680 which is fixedly secured at the lower end thereof to the platen 52 and is pivotally secured to the bearing housing 678 by means of a pin 682. The upper portion 684 of the screw jack mechanism 680 is vertically adjusting nut 688 threadedly secured to the shaft 686 and abuttingly engaged with the upper portion 684 of the screw jack mechanism 680. The screw jack mechanism 680 provides means for precisely vertically positioning the curling head 674 vertically relative to the dial plate 50. When precise positioning is achieved through the adjustment of the screw jack mechanism 680, a jam nut 689, which is threadedly secured to the threaded shaft 686 can be engaged against the upper surface of the upper portion 684 to lock the screw jack mechanism 680 in the desired position.

The curling head 674 is provided with a downwardly facing annular groove 690 which is adapted to engage the upwardly facing circular upper edge portion of a generally cylindrical ring on the mandrel 54 positioned therebelow to curl the upper edge of the ring radially inwardly and downwardly over the upwardly extending skirt of the generally circular disc positioned within the ring to form a ring-type closure. This curling action is achieved by simultaneously rotating the curling head 674 and moving the thus rotating curling head downwardly in response to the downward movement of the platen 52. The curling head is preferably provided with a plurality of ring-engaging inserts 692 which extend radially inwardly into the curling head 674 and intersect the annular groove 690. The inserts 692 are preferably formed of an exceptionally hard, wear-resistant material such as tungsten carbide which provides increased operating life for the curling head 674. The liquid lubricant previously applied to the upper outer surface of the generally cylindrical ring during the indexing thereof from the adhesive dispensing station 500 to the curling station 650 also serves to increase the operating life of the curling head 674 and prevent damage to the generally ring by reducing the friction and resulting heat generated by engaging the generally cylindrical ring with the rotating curling head. The inserts 692 preferably are each provided with a pair of grooves 694 which correspond in size and shape to the configuration of the annular groove 690. Provision of two grooves 694 in each insert 692 permits each insert to be rotated 180° in the curling head 674 thus providing two working surfaces on each insert and doubling the life thereof. The inserts 692 are each suitably locked in position in the curling head 674 by a corresponding set screw 696.

Proper tension is maintained on the flexible endless drive member 666 by means of a threaded adjusting bolt 698 which extends between the pedestal 652 and the motor mount 656.

In the operation of the curling station 650, the drive motor 654 is preferably operated continuously although it is within the ambit of the present invention to operate the drive motor intermittently if desired. The rotating curling head 674 is reciprocated from a first upper position to a second, ring engaging position and back to the first position in response to the vertical reciprocation of the platen 52 once during each dwell period of the dial plate 50 during the predetermined time period of dwell.

Figure 15:
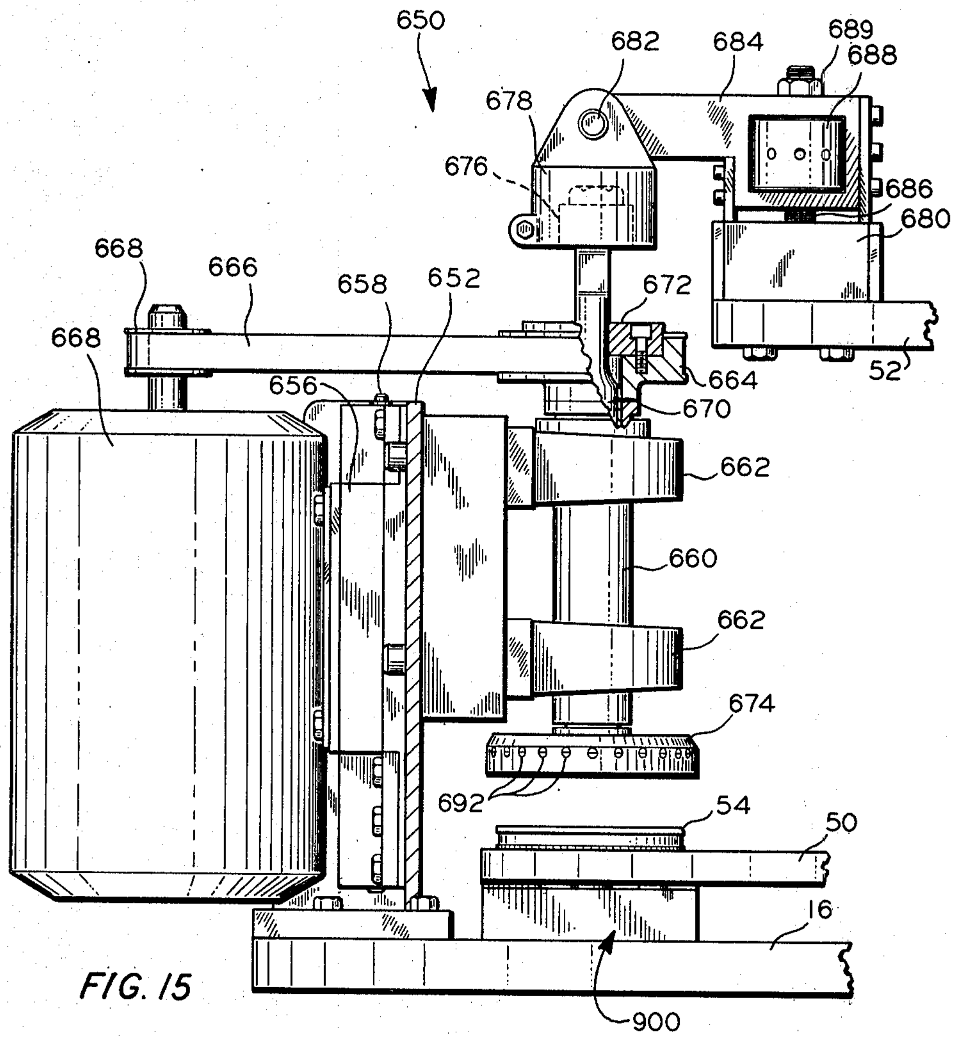
FIG. 15 is an enlarged fragmentary view taken along line 15—15 of FIG. 2 illustrating construction details of the curling station with portions broken away to facilitate understanding.
Figure 16:
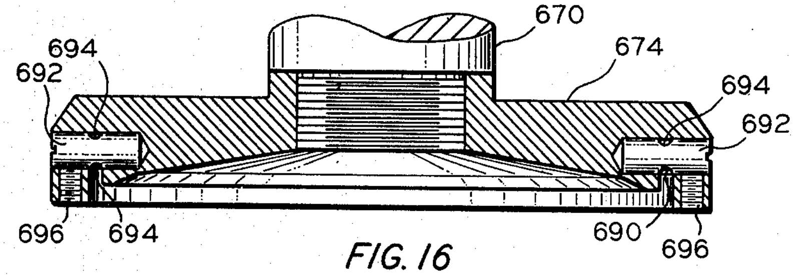
FIG. 16 is a further enlarged vertical cross-section taken along the center line of the curling head.

The grooving station or mechanism 700 is best illustrated in FIGS. 1, 2, 17, 18 and 19. The grooving station 700 comprises a pedestal 702 which is fixedly secured to the tool mounting plate 16 and is positioned adjacent a mandrel 54 on the dial plate 50 when the dial plate 50 is in the dwell position for the predetermined period of dwell time. An electric drive motor 704 is mounted on a motor mount 706 which is in turn pivotally secured to the pedestal 702 by means of a vertically aligned hinge pin 708. The drive motor 704 is oriented with the output drive shaft thereof extending vertically upwardly from the motor housing. A thimble 710 is vertically journaled on the pedestal 702 by means of a pair of pillow block bearings 712 mounted on the pedestal 702 with the thimble 710 being adapted to rotate in the bearings 712 about a vertical axis coaxially aligned with a mandrel 54 during the dwell period of the dial plate 50. A driven pulley 714 is drivingly secured to the upper end portion of the thimble 710. A spindle 716 is slidably received within the thimble 710 and is adapted for vertical reciprocation relative to the thimble 710 and rotation with the thimble about the vertical axis of rotation of the thimble. The upper end portion of the spindle 716 is drivingly secured in splined relation to the driven pulley 714 in a manner substantially identical to that previously described for the curling station 650 and as illustrated in FIG. 15.

The lower end portion 718 of the spindle 716 is drivingly secured to a grooving head assembly 720 which is adapted to rotate with the spindle 716. The upper end portion of the spindle 716 is secured to a suitable thrust bearing 722 which is in turn secured within a crimp type bearing housing 724. The bearing housing 724 is secured to the reciprocatable platen 52 by means of a screw jack mechanism 726 fixedly secured to the platen 52 and a pin 728 mutually interconnecting the bearing housing 724 and the screw jack mechanism 726. The upper portion 730 of the screw jack mechanism 726 is vertically adjustable relative to the platen 52 by means of an externally threaded vertical shaft 732 and an internally threaded adjusting nut 734 threadedly engaged with the shaft 732 and abuttingly engaged with the upper portion 730 of the screw jack mechanism 726 whereby rotation of the adjusting nut 734 relative to the shaft 732 provides vertical adjustment of the upper portion 730 of the screw jack mechanism relative to the platen 52. An internally threaded jam nut 736 threadedly secured to the shaft 732 provides means for locking the screw jack mechanism 726 when the desired adjustment of the screw jack mechanism has been achieved by manipulation of the adjusting nut 734.

The driven pulley 714 is drivingly connected to the electric drive motor 704 by means of a suitable endless flexible drive member 738, such as a grooved timing belt, and a drive pulley 740 drivingly secured to the output shaft of the drive motor 704.

The grooving head assembly 720 includes a grooving head body 742, a grooving wheel slide 744, a grooving wheel 746 journaled on the outer end portion 748 of the grooving wheel slide 744, a grooving slide roller subassembly 750, a retaining clip 752 and a grooving head bottom plate 754.

Figure 19:
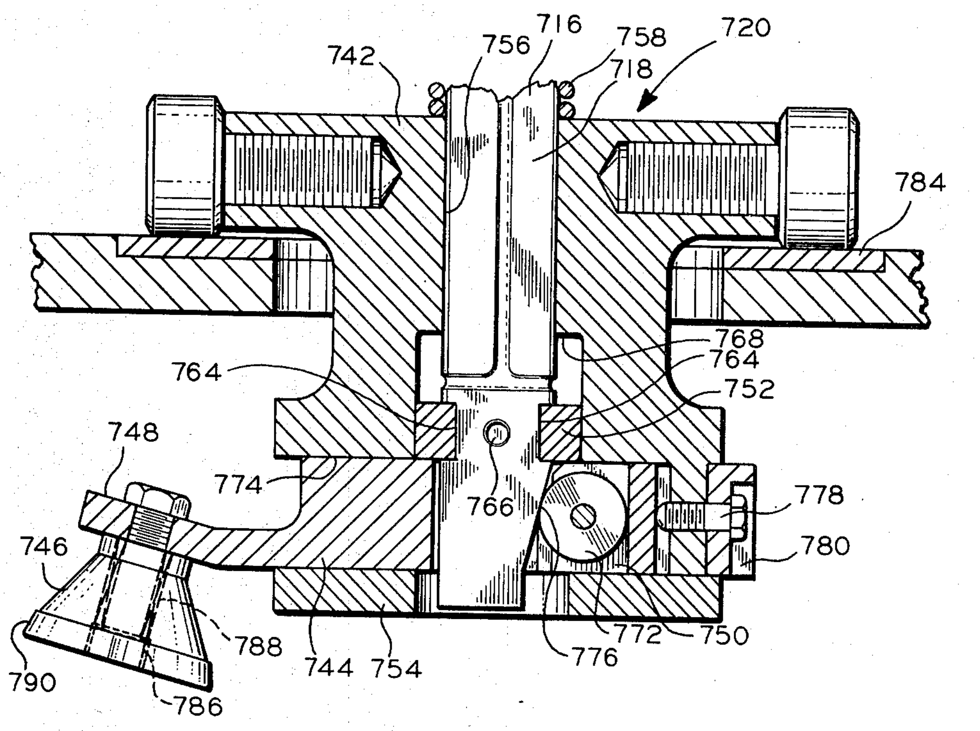
FIG. 19 is a further enlarged cross-section taken along the vertical center line of the grooving head assembly parallel to the line of movement of the grooving wheel slide, and illustrating the position of the parts of the grooving head assembly when the grooving wheel slide is radially retracted.
Figure 14:
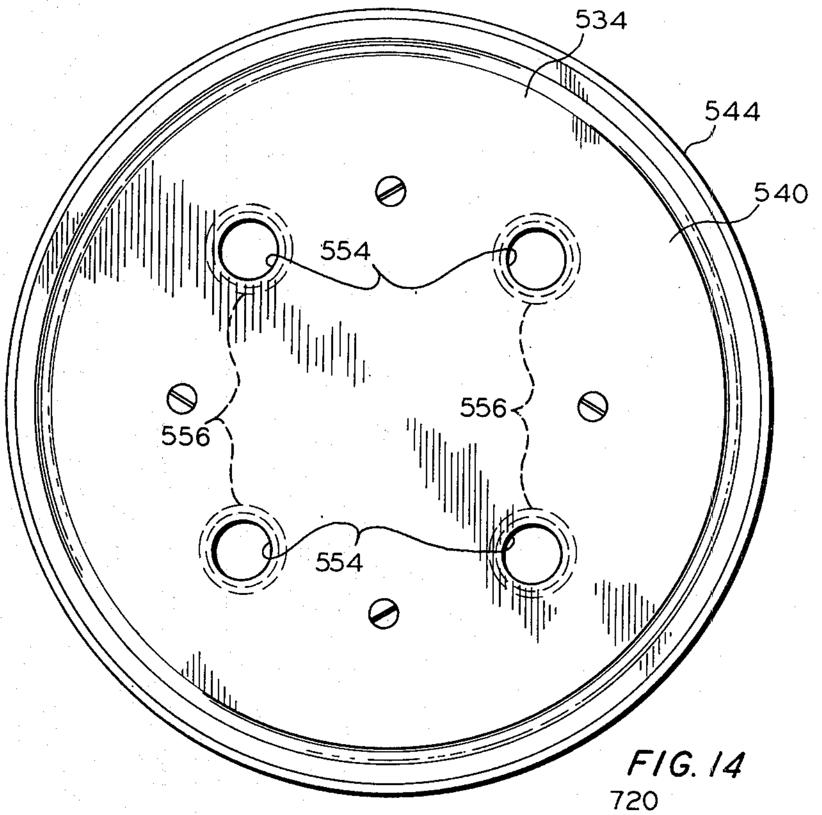
FIG. 14 is a further enlarged bottom plan view of the adhesive dispenser subassembly.
Figure 18:
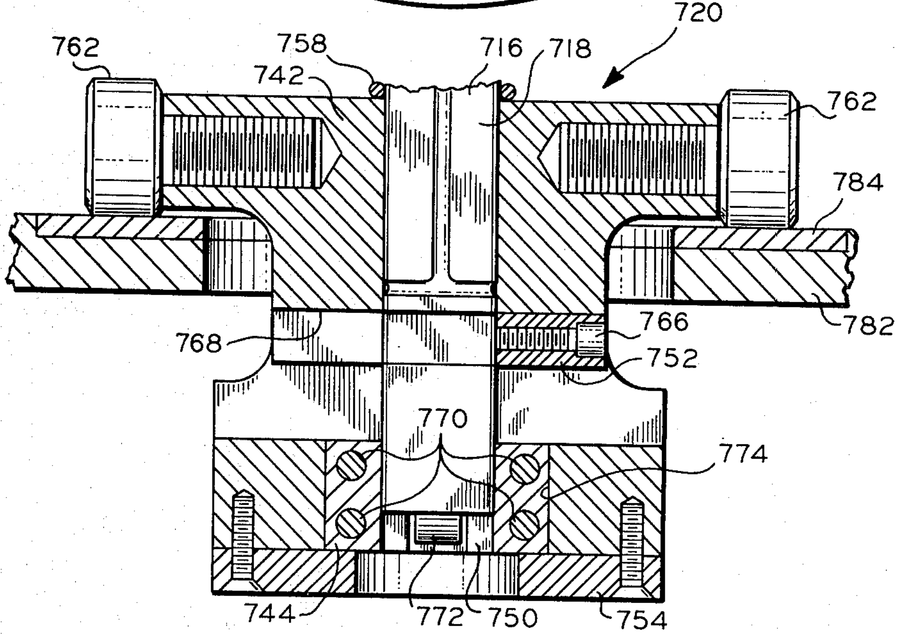
FIG. 18 is a further enlarged cross-section taken along the vertical center line of the grooving head assembly normal to the line of movement of the grooving wheel slide, and illustrating the position of the parts of the grooving head assembly when the grooving wheel slide is radially extended.

The lower end portion 718 of the spindle 716 is preferably of a generally rectangular horizontal cross section and is slidingly received in a vertical passage 756 in the grooving head body 742 of corresponding generally rectangular horizontal cross section to provide splined engagement therebetween. A compression coil spring 758 is disposed about the lower end portion 718 of the spindle 716 and extends between the grooving head body 742 and a collar 760 disposed about and secured to the spindle 716 a distance above the grooving head body 742. The grooving head body 742 carries a plurality, preferably 4, cam rollers 762 journaled thereon in circumferentially spaced relation about the grooving head body 742, the cam rollers 762 being adapted to rotate about horizontal axes lying in a common horizontal plane. The retaining clip 752 is generally U-shaped and is received in a pair of grooves 764 formed on opposite sides of the spindle 716. The retaining clip 752 is further fixedly secured to the spindle 716 by means of a threaded bolt 766 which passes through the retaining clip 752 and is threadedly engaged within a tapped hole in the spindle 716. The retaining clip 752 is in turn received within a transverse slot 768 extending across the grooving head body 742. The grooving slide roller subassembly 750 is fixedly secured to the grooving wheel slide 744 by means of a plurality of bolts 770 so as to form a unitary assembly. The grooving slide roller subassembly 750 includes a cam roller 772 journaled thereon for rotation about a horizontal axis. The grooving wheel slide 744 and grooving slide roller subassembly 750 are adapted for horizontal sliding movement in a second transverse slot 774 extending partially through the grooving head body 742. The cam roller 772 rollingly engages an inclined cam surface 776 formed on the lower end portion 718 of the spindle 716. The cam roller 772 is biased into continuous engagement with the cam surface 776 by means of a pair of spring plungers 778 (one shown) which are threadedly secured to the grooving head body 742 and abuttingly engage the grooving slide roller subassembly 750 as shown in FIG. 19. The grooving wheel slide 744 and grooving slide roller subassembly 750 are retained in the slot 774 by means of the grooving head bottom plate 754 which is fixedly secured to the grooving head body 742 by means of a plurality of threaded screws as shown in FIG. 18. A counterweight 780 is mounted on the groove head body 742.

A generally horizontal track mounting plate 782 is fixedly secured to the pedestal 702 and is provided with an aperture therein through which a portion of the grooving head body 742 is received. Track mounting plate 782 supports a generally circular grooving track 784 on the upper surface thereof which surrounds the aperture in the track mounting plate 782 and is adapted to receive the cam rollers 762 in rolling engagement therewith. The grooving wheel 746 is preferably mounted on a suitable threaded shoulder bolt 786 with a suitable needle bearing 788 interposed between the bolt 786 and the grooving wheel 746. The grooving wheel 746 is provided with a peripheral contact surface 790 which is adapted to engage the cylindrical outer surface of a generally cylindrical ring of a ring-type closure so as to crimp or emboss a circumferential groove therein during the operation of the grooving station 700. The contact surface 790 can be either smooth or can be provided with suitable surface relief, such as circumferentially spaced generally vertical grooves to provide a desired pattern in the embossed groove.

Suitable tension is maintained on the flexible drive member 738 by means of a threaded adjusting bolt 792 extending between the pedestal 702 and the motor mount 706, as shown in FIG. 2.

Figure 17:
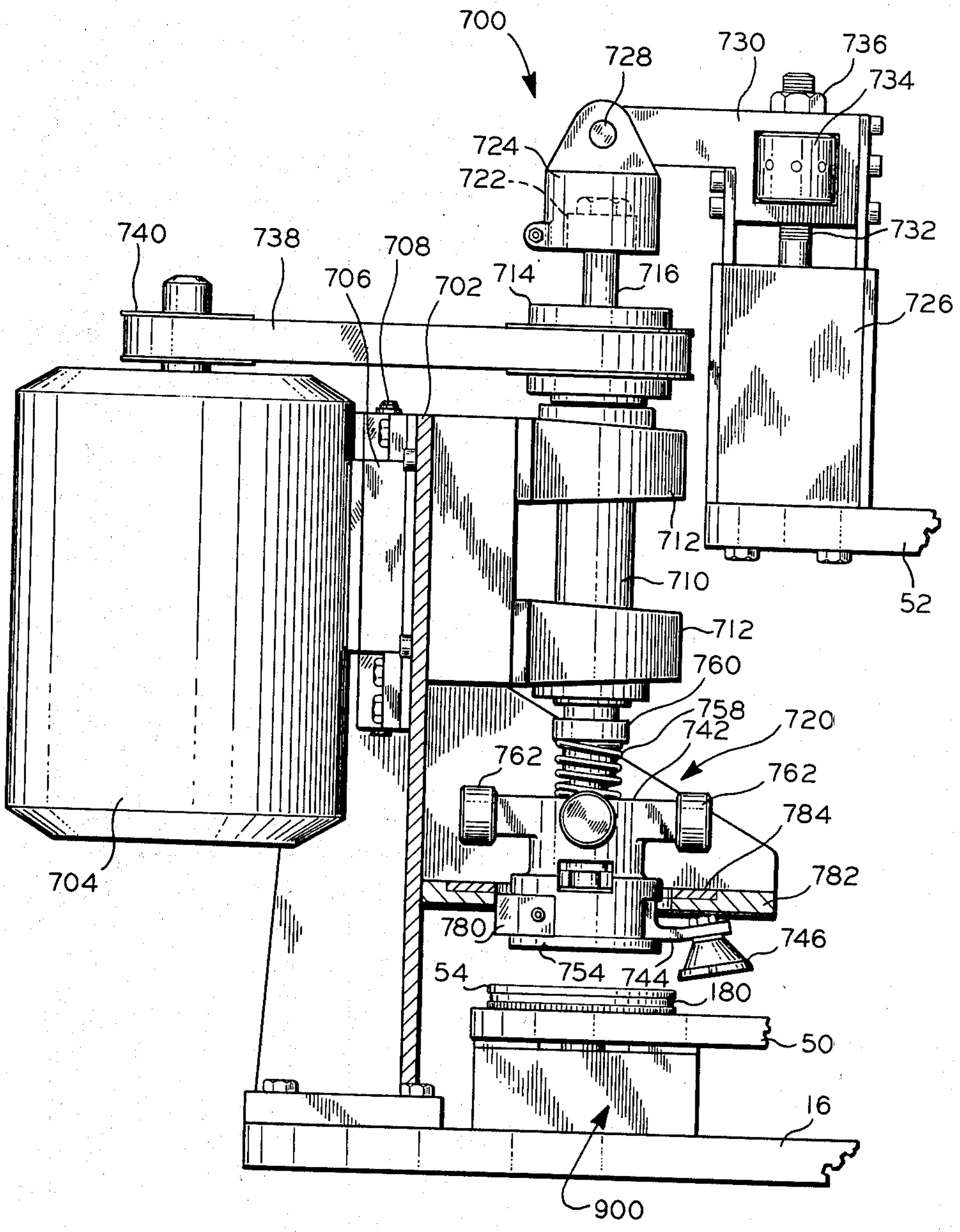
FIG. 17 is an enlarged fragmentary view taken along line 17—17 of FIG. 2 illustrating construction details of the grooving station with portions broken away to facilitate understanding.

In the operation of the grooving station 700, the thimble 710 and although it is within the ambit of the present invention to include intermittent rotation of these elements. When the dial plate 50 is in the dwell position with an ungrooved ring-type closure properly positioned on the mandrel 54 coaxially aligned with the spindle 716, the initial downward movement of the reciprocatable platen 52 causes the rotating grooving head assembly 720 to move downwardly with the spindle 716. At this time the grooving head assembly 720 is in the condition substantially as illustrated in FIG. 17. The rotating grooving head assembly 720 continues to move downwardly with the spindle 716 until the cam rollers 762 contact the grooving tack 784 as illustrated in FIG. 18. At this point the grooving wheel slide 744 is extended radially outwardly relative to the grooving head body 742 to the maximum extent under the urging of the spring plungers 778. Continued downward movement of the spindle 716 relative to the grooving head assembly 720 simultaneously causes compression of the compression coil spring 758 and downward movement of the cam surface 776 relative to the cam roller 772 causing the grooving wheel slide 744 to be retracted relative to the rotating grooving head body 742, as shown in FIG. 19, causing the contact surface 790 of the grooving wheel 746 to rollingly engage the cylindrical outer surface of the ring-type closure adjacent thereto thus resulting in the crimping or embossing of an annular groove in the generally cylindrical ring of the ring-type closure. The previously mentioned circumferential groove 180 in the mandrel 54 is vertically aligned with the contact surface 790 of the grooving wheel 746 to provide relief for the side wall of the ring-type closure as it is forced radially inwardly by the grooving action of the grooving head assembly 720 to form a radially inwardly extending rib or ridge on the inner surface of the side wall.

As the platen 52 moves upwardly from its second position to return to the uppermost first position thereof, the spindle 716 is moved upwardly relative to the rotating grooving head body 742 which is maintained in its lowermost position by the urging of the compression coil spring 758 until such time as the groovig wheel slide 744 is fully extended radially outwardly under the urging of the spring plunger 778 and the retaining clip 752 abuts the upper surface of the transverse slot 768, as shown in FIG. 18. Continued upward movement of the spindle 716 raises the grooving head assembly 720 to the position illustrated in FIG. 17 at which point the previously grooved ring-type closure is clear to be indexed by the dial plate 50 to the ejecting station 800.

The closure ejecting station 800 is best illustrated in FIGS. 1, 2 and 20. The closure ejecting station includes a reciprocatable ejecting mechanism frame 802 fixedly secured to and extending generally downwardly from the reciprocatable platen 52. The frame 802 includes a generally horizontally extending bracket 804 on the lower end portion thereof which extends generally radially outwardly from the axis of rotation of the dial plate 50 over a respective mandrel 54 positioned adjacent the closure ejecting station 800 when the dial plate 50 is in the dwell position for the previously mentioned predetermined period of time. A vertically oriented externally threaded rod 806 extends through a vertical aperture 808 in the bracket 804 and is fixedly secured to the bracket 804 by means of a pair of jam nuts 810 and 812 threadedly engaged with the rod 806 and abuttingly engaging the upper and lower sides of the bracket 804, respectively. A vaccum head assembly 814 is mounted on the lower end portion 816 of the rod 806. The vacuum head assembly 814 includes an internally threaded collar 818 which is threadedly secured to the lower end portion 816 of the rod 806 and is in turn fixedly secured by means of a plurality of threaded bolts to a generally circular upper vacuum head member 820. A downwardly facing, generally circular cavity 822 is formed in the lower surface of the upper vacuum head member 820. A generally circular lower vacuum head member 824 is fixedly secured to the lower annular face 826 of the upper vacuum head member 820 by means of a plurality of threaded screws (one shown). A plurality of apertures 828 extend through the lower vacuum head member 824 and communicate between the lower face of the lower vacuum head member and the cavity 822 in the upper vacuum head member 820. It will be understood that, while the threaded rod 806 is described and illustrated as being threadedly secured to the collar 818, the rod 806 and collar 818 can be fixedly secured together by other suitable means such as welding or the like.

A rigid pipe or conduit 830 is threadedly secured at the lower end portion thereof to the upper vacuum head member 820 via an internally threaded aperture 832 with the open lower end of the pipe 830 in fluid flow communication with the cavity 822 of the upper vacuum head member 820. The upper externally threaded end portion of the pipe 830 is threadedly secured to an internally threaded aperture 834 formed in the lower portion 836 of a vacuum valve assembly 838. The open upper end of the pipe 830 is in fluid flow communication with the flat upper surface of the lower portion 836. A pivot bracket 840 is fixedly secured to the end of the lower portion 836 opposite the pipe 830. An upper portion 842 of the vacuum valve assembly 838 is positioned directly on top of the lower portion 836 and is pivotally secured to the pivot bracket 840 by means of a horizontal hinge pin 844. A vacuum fitting 846 is threadedly secured in an internally threaded aperture 848 formed in the upper portion 842 of the vacuum valve assembly and coaxially aligned with the internally threaded aperture 834 in the lower portion 836 of the vacuum valve assembly. The open lower end of the vacuum fitting 846 is in fluid flow communication with the flat lower surface of the upper portion 842. A conduit 850 communicates at one end thereof with the vacuum fitting 846 and is in fluid communication at the opposite end thereof with the vacuum pump 22. The upper surface of the lower portion 836 and the lower surface of the upper portion 842 are biased together into substantially fluid type relation by means of a valve spring assembly 852. The valve spring assembly 852 includes a threaded stud 854 which extends through a clear aperture 856 in the upper portion 842 and is threadedly secured in the lower portion 836 intermediate the pipe 830 and the pivot bracket 840. A compression coil spring 858 is disposed about the stud 854 intermediate the upper portion 842 of the vacuum valve assembly and an internally threaded adjusting nut 860 threadedly secured to the upper end portion of the threaded stud 854. The adjusting nut 860 provides means for varying the bias of the compression coil spring 858 on the upper portion 842 of the vacuum valve assembly to thereby adjust the force maintaining the substantially fluid tight engagement between the upper and lower portions of the vacuum valve assembly 838. The end portion 862 of the upper portion 842 of the vacuum valve assembly opposite the vacuum fitting 846 extends beyond the horizontal hinge pin 844.

An exit trough mounting pedestal 864 is fixedly secured to the tool mounting plate 16 adjacent a mandrel 54 when the valve plate 50 is in its dwell position. An exit trough 866 is fixedly secured to the pedestal 864 and extends from the vacuum head assembly 814 generally radially outwardly from the axis of rotation of the dial plate 50. The trough 866 is provided with a bottom plate 868 and a pair of side walls 870 and 872 extending upwardly therefrom defining an exit path for completed ring-type closures. The inner end portion 874 of the bottom plate 868 is positioned proximate to a respective mandrel 54 when the dial plate 50 is in the dwell position and is positioned a short distance above the top surface 56 of the mandrel 54.

An overarm 876 is fixedly secured to the upper end portion of the exit trough mounting pedestal 864 with the inner end portion 878 thereof being positioned directly over the end portion 862 of the upper portion 842 of the vacuum valve assembly 838. A threaded bolt 880 is vertically threadedly engaged with the inner end portion 878 of the overarm 876 in coaxial alignment with the end portion 862 of the upper portion 842 of the vacuum valve assembly. A protective actuator tip 882, preferably formed of nylon or the like, is mounted on the lower end portion of the bolt 880 and is adapted to engage the end portion 862 of the upper portion 842 of the vacuum valve assembly and rotate the end portion 862 clockwise about the horizontal hinge pin 844 as viewed in FIG. 20 when the reciprocatable platen 52 moves into its uppermost first position. The actuation of the vacuum valve assembly 838 is adapted to break the substantially fluid tight communication between the vacuum fitting 846 and the pipe 830. A jam nut 884, threadedly engaged with the bolt 880, provides means for fixedly securing the bolt 880 to the overarm 876 when the desired vertical positioning of the actuator tip 882 has been achieved.

A ring blower mount 886 is fixedly secured to the bracket 804 intermediate the axis of rotation of the dial plate 50 and the exit trough 866. An air nozzle 888 is mounted on the lower portion of the ring blower mount 886 and is positioned so as to direct a fluid stream emanating therefrom directly below and across the lower vacuum head member 824 in the direction of the exit trough 866. The ring blower mount 886 is provided with a passage 890 extending therethrough and providing fluid flow communication between the nozzle 888 and an air fitting 892 in the upper end portion of the ring blower mount 886. A conduit 894 extends between the fitting 892 and a source of pressurized fluid, preferably a source of pressurized air, as will be described in detail hereinafter.

The closure ejecting station or mechanism 800 operates in the following manner. As each mandrel 54 is indexed to the dwell position adjacent the closure ejecting station 800, the reciprocatable platen 52 is in its first or uppermost position with the vacuum head assembly 814 raised to provide a clearance of about $1\frac{1}{2}$ inches between the lower face of the lower vacuum head member 824 and the circular upper edge of an assembled and grooved ring-type closure 896. As mentioned above, when the platen 52 is in the first position thereof, the actuator tip 882 is in engagement with the end portion 862 of the upper portion 842 of the vacuum valve assembly 838 thereby breaking the constantly applied vacuum being applied by the vacuum pump 22 to the vacuum head assembly 814 via the conduit 850. When the dial plate 50 is indexed to the dwell position with a completed ring-type closure on mandrel 54 adjacent the closure ejecting station 800, the platen cycles downwardly, as mentioned above, to its second position proximate to the dial plate 50. When the platen 52 moves to the second position thereof, as shown in FIG. 20, the actuator tip 882 releases contact with the upper portion 842 of the vacuum valve assembly 838 applying vacuum to the vacuum head assembly 814, and the lower vacuum head member 824 engages the circular upper edge of the ring-type closure in generally fluid-tight relation. The vacuum applied to the cavity 822 in the vacuum head assembly 814 is applied via the apertures 828 to the completed ring-type closure thereby retaining the ring-type closure against the vacuum head assembly 814. As the platen 52 continues its reciprocation from its second position to its first position distal from the dial plate, the vacuum head assembly 814 withdraws the completed ring-type closure 896 from the mandrel 54. As the actuator tip 882 again contacts the upper portion 842 of the vacuum valve assembly 838 to break the vacuum applied therethrough to the vacuum head assembly 814, pressurized air is dispensed from the nozzle 888 to propel the assembled ring-type closure 896 from beneath the vacuum head assembly 814 into the exit trough 866 and through the exit trough to a predetermined location remote from the apparatus 10.

Figure 23:
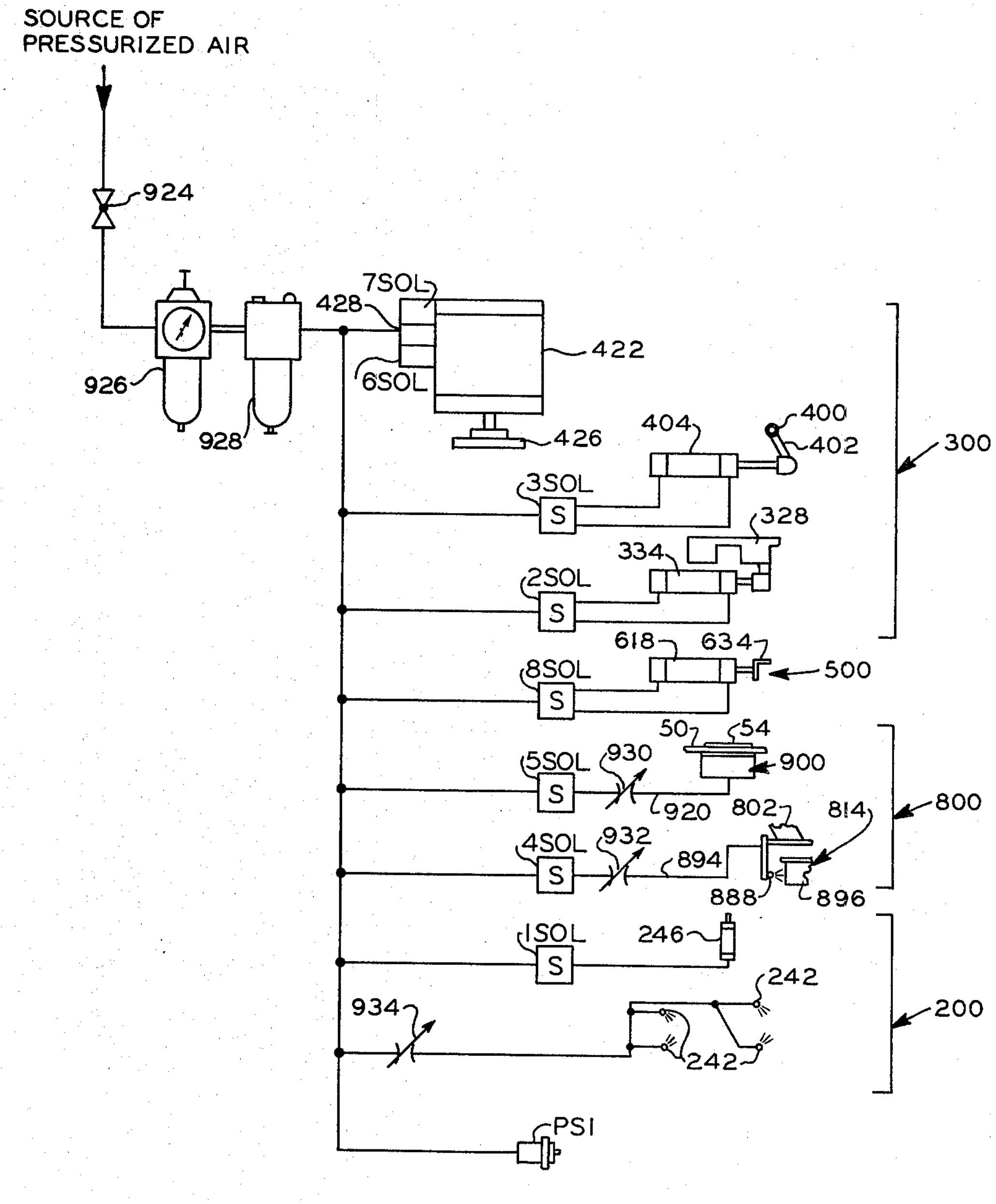
FIG. 23 is a diagrammatical illustration of a pressurized air system constructed in accordance with the present invention.

Also illustrated in FIG. 20 is a backup plate assembly 900. The backup plate assembly comprises a backup mount block 902 which is fixedly secured to the tool mounting plate 16 directly below the location of each mandrel 54 when the dial plate 50 is in the dwell position. The backup mount block 902 has a substantially flat upper surface upon which two wear plates 904 are each fixedly secured by means of a plurality of threaded flathead screws 906. The wear plates 904 are preferably formed of Ryton® polyphenylene sulfide resin available from Phillips Petroleum Company, Bartlesville, Oklahoma. A counterbore 908 is formed in the central portion of the upper surface of the backup mount block 902. An internally threaded aperture 910 is coaxially aligned with the counterbore 908 and communicates between the counterbore and the bottom surface of the backup mount block 902. A generally cylindrically shaped valve member 912 is closely received within the counterbore 908 and carries a resilient annular seal 914, such as a rubber O-ring, in a circumferential annular groove in the cylindrical outer surface of the valve member 912 which provides a sliding fluid tight seal between the valve member 92 and the counterbore 908. A compression coil spring 916 is disposed within a counterbore in the lower end portion of the valve member 912 and biases the valve member 912 upwardly relative to the backup mount block 902 against the lower surface of the dial plate 50. The valve member 912 is further provided with an aperture 918 which communicates between the counterbore 908 and the flat upper surface of the valve member 912. A conduit 920 extends through an aperture 922 in the tool mounting plate 16 and is threadedly secured to the internally threaded aperture 910 in the backup mount block 902. The conduit 920 provides fluid communication between the backup plate assembly 900 adjacent the closure ejecting station 800 and a source of pressurized air as best illustrated in FIG. 23. The valve member 912 provides sequential fluid flow communication between the source of pressurized air and the respective passages 64 in the dial plate as the dial plate is successively positioned in the dwell position. The valve member 912 is also preferably formed of Ryton® polyphenylene sulfide resin.

It should also be noted at this time that four additional backup plate assemblies 900 are located respectively beneath the dial plate 50 adjacent the disc feed station 300, the adhesive dispensing station 500, the curling station 650 and the grooving station 700. The application of pressurized air to the backup plate assembly 900 adjacent the closure ejecting station 800 assists in the withdrawal of each completed ring-type closure from its respective mandrel by means of the vacuum head assembly 14 by applying air pressure to the inside of the ring-type closure. The backup plate assemblies 900 associated with the other stations on the apparatus 10 each communicate with the vacuum pump 22 by suitable conduits as illustrated in FIG. 24 to assist in the retention of the generally circular discs and partially assembled ring-type closures at the various operating stations prior to the closure ejecting station.

FIG. 23 diagrammatically illustrates the pressurized air system utilized with the apparatus 10. Air is provided to the system from a suitable source of pressurized air, such as plant air, at a pressure preferably greater than 40 psi (275.6 kPa). Pressurized air is provided to the system through suitable conduits via a suitable shutoff valve 924, such as a ball valve, a combination regulator, filter and pressure gauge 926 and an oiler 928. From the oiler 928, pressurized air is provided to the power cylinder 422 via the control valve assembly 428. Pressurized air is provided to the power cylinder 404 via solenoid control valve 3SOL. Pressurized air is provided to the power cylinder 334 via solenoid control valve 2SOL. Pressurized air is provided to the power cylinder 618 via the solenoid control valve 8SOL. Pressurized air is provided to the backup plate assembly 900 adjacent the closure ejecting station 800 via solenoid control valve 5SOL and a suitable flow control valve 930, preferably a needle valve. Pressurized air is provided to the nozzle 888 of the closure ejecting station 800 via solenoid control valve 4SOL, flow control valve 932, preferably a needle valve, and conduit 894. Pressurized air is provided to the ring stop air cylinder 246 of the ring feed station 200 via solenoid control valve 1SOL. Pressurized air is provided to the air jets 242 of the ring feed station 200 via flow control valve 934, preferably a needle valve. Pressurized air is also provided from the oiler 928 to pressure switch PS1 which preferably responds to decreasing pressure in the system which reaches 40 psi.

Figure 24:
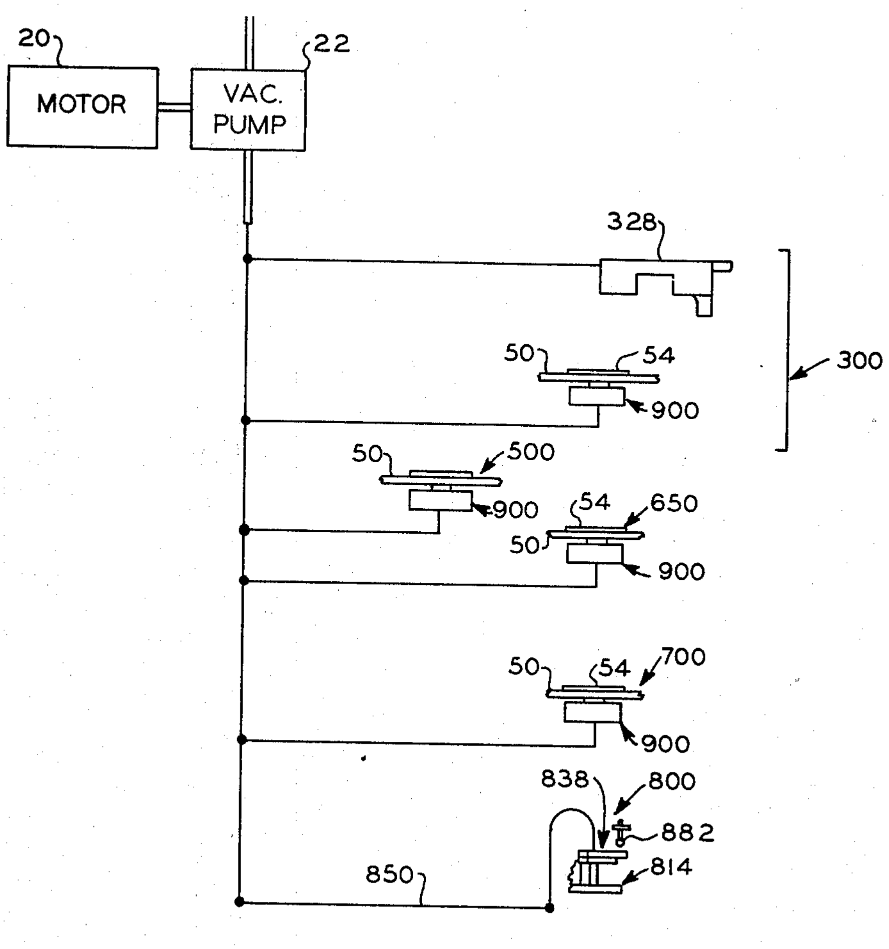
FIG. 24 is a diagrammatical illustration of a vacuum system constructed in accordance with the present invention.

FIG. 24 diagrammatically illustrates the vacuum system employed with the apparatus 10. Vacuum pump 22 is driven by the motor 20. Vacuum is applied from the vacuum pump to the disc carriage 328 of the disc feed station 300 as well as to the backup plate assembly 900 positioned below the dial plate 50 adjacent the disc feed station 300. Vacuum is also applied to the backup plate assembly 900 positioned below the dial plate 50 adjacent the adhesive dispensing station 500 as well as to the backup plate assembly 900 positioned below the dial plate 50 adjacent the curling station 650. Vacuum is also applied by the vacuum pump 22 to the backup plate assembly 900 positioned below the dial plate 50 adjacent the grooving station 700, while vacuum is provided via the conduit 850 and the vacuum valve assembly 838 to the vacuum head assembly 814 of the closure ejecting station 800.

Figure 21:
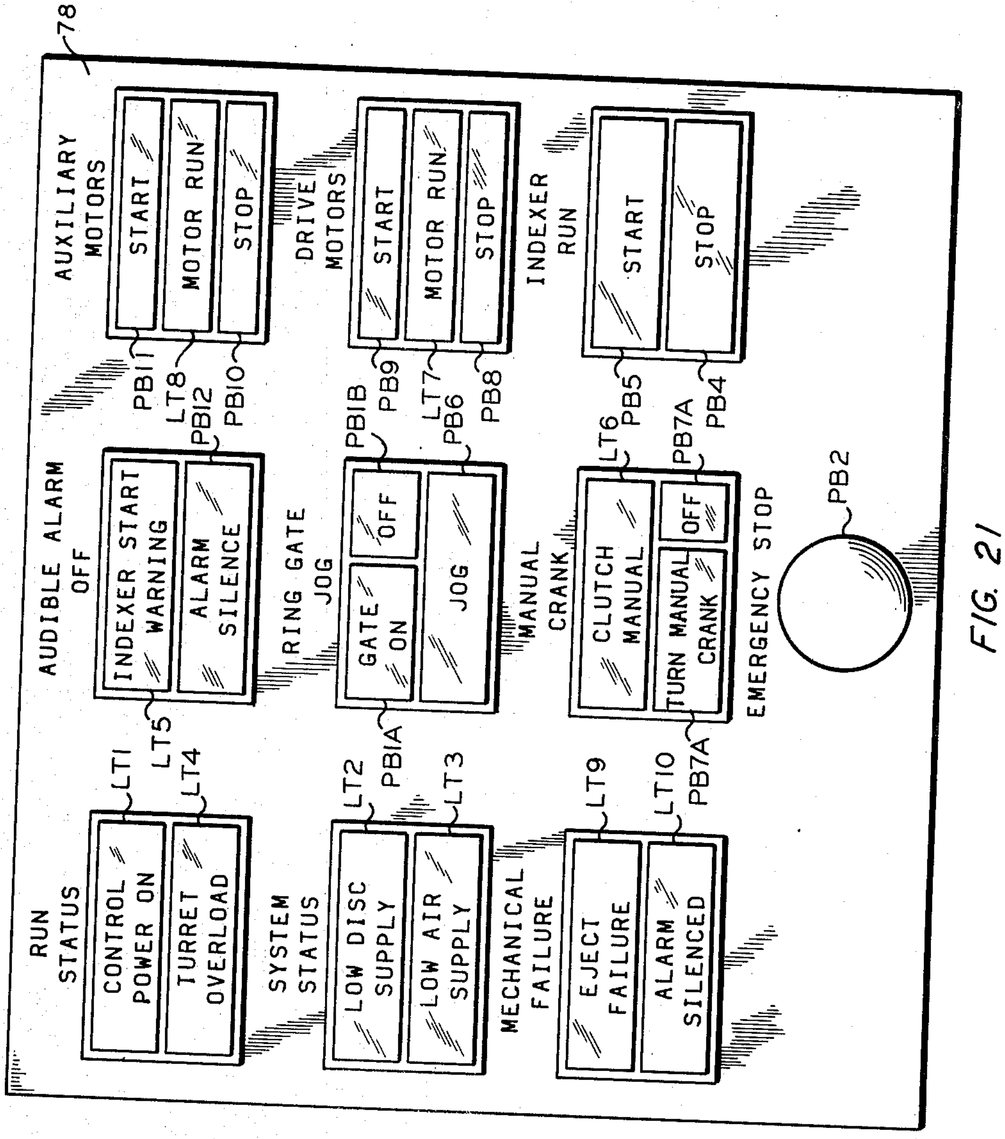
FIG. 21 is an enlarged elevation view of the face of the operator's consolet.
Figure 22A:
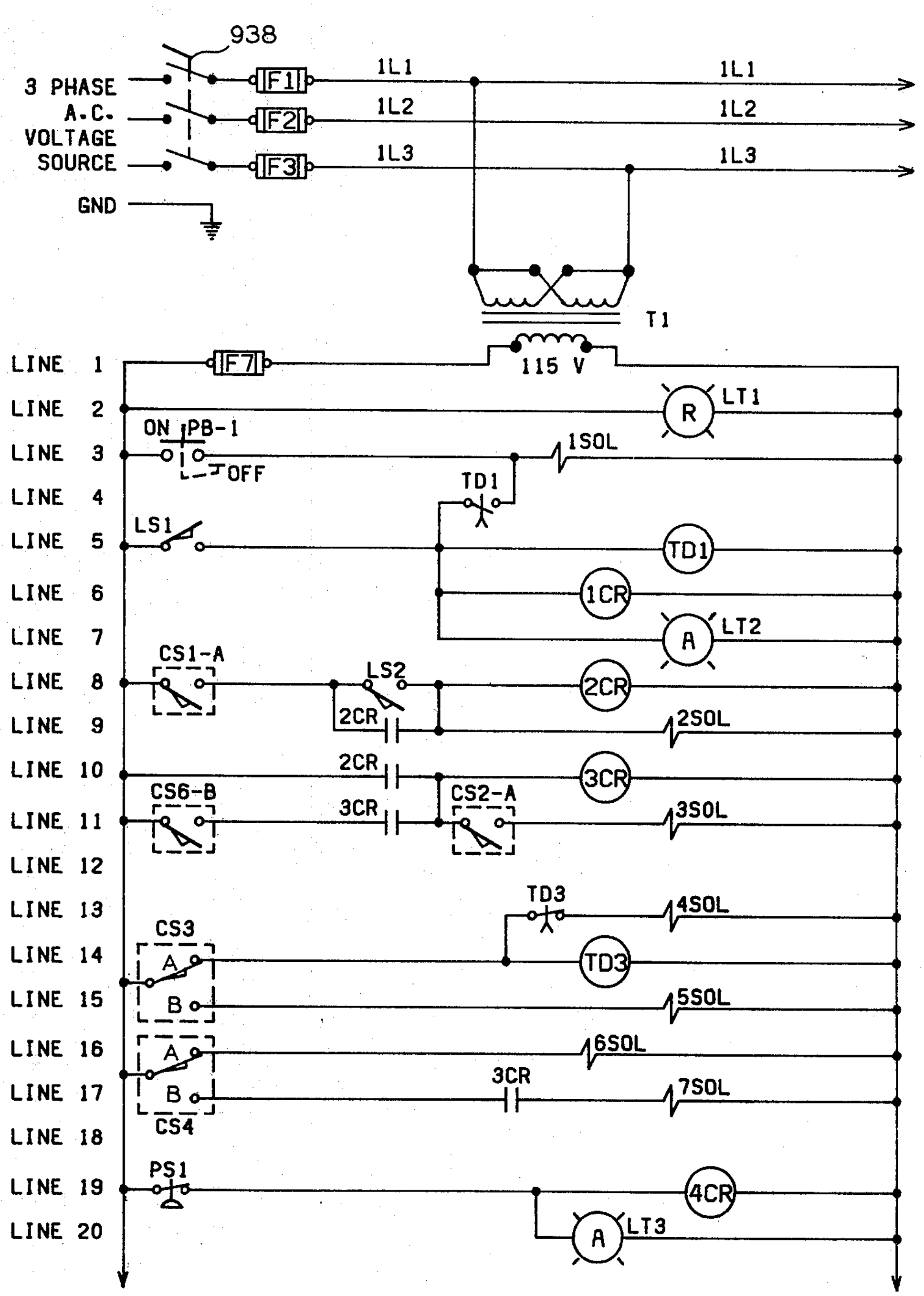
FIGS. 22A, 22B and 22C are schematic illustrations of a control system for the machine of the present invention.
Figure 22B:
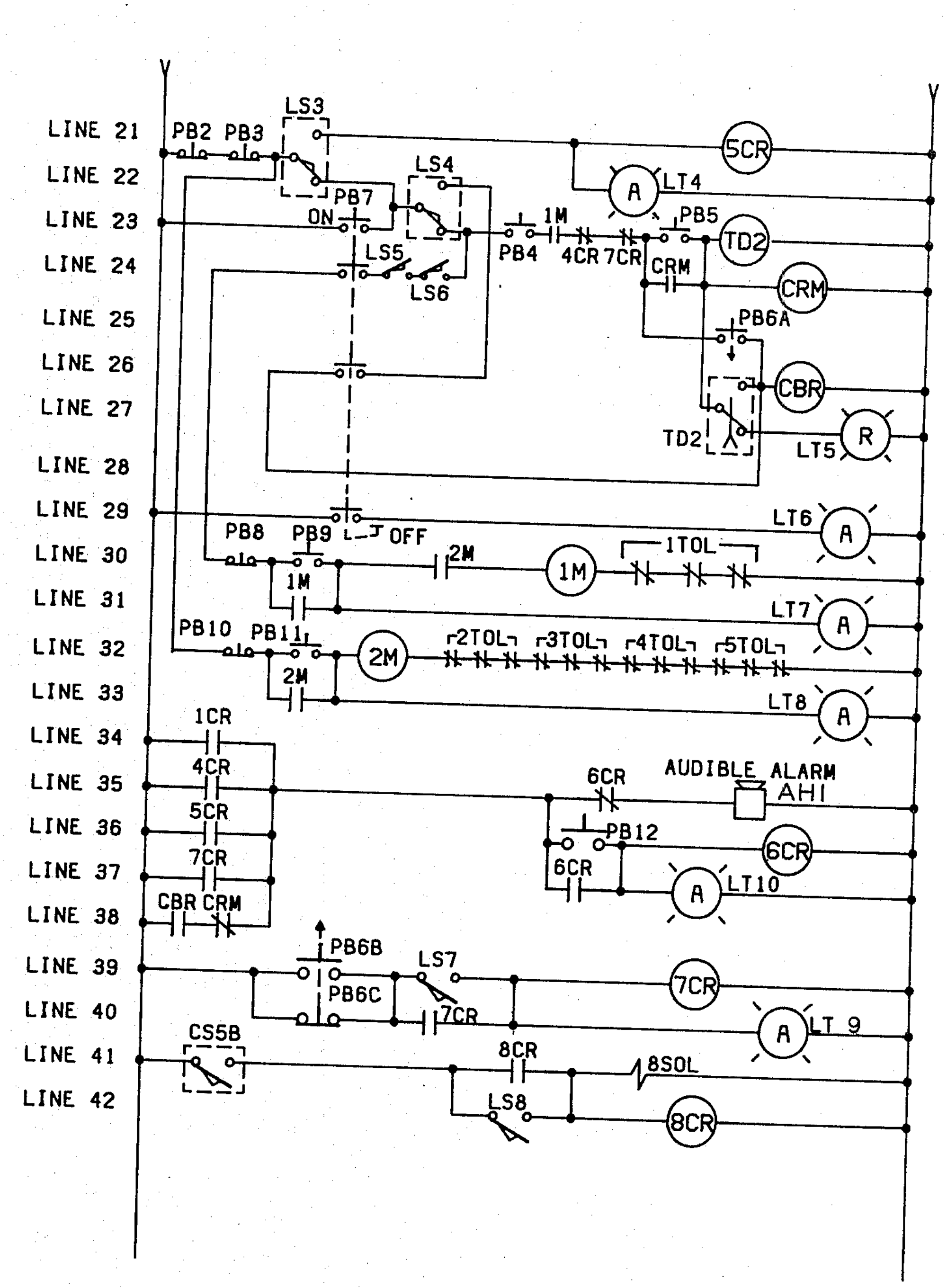
Figure 22C:
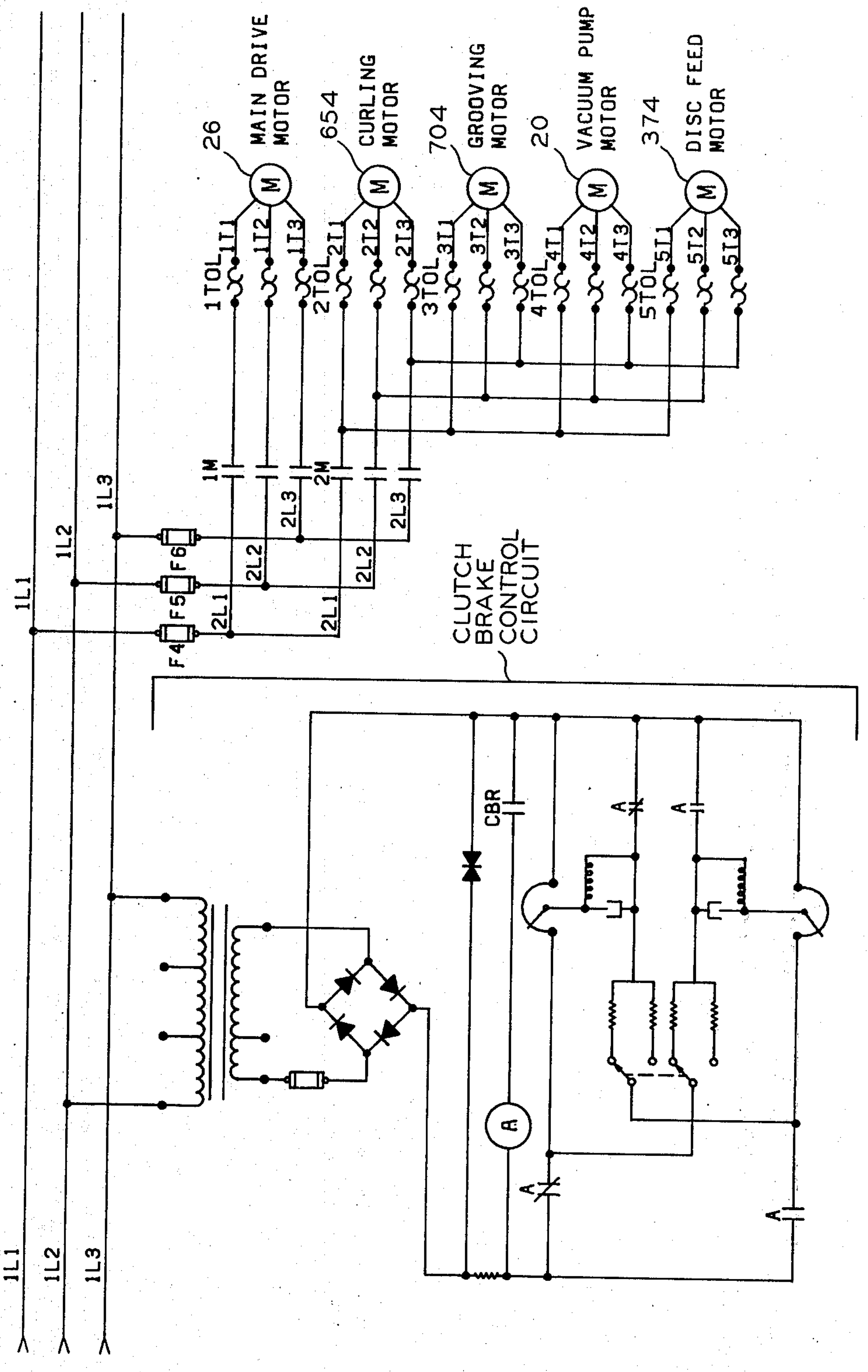

The control system employed with the apparatus 10 can best be understood on reference to FIGS. 21, 22A, 22B, 22C, 23 and 24. FIG. 21 illustrates the face of the operator's consolet 78 showing the actual arrangement of the various pushbuttons and control indicator lights associated with the operation of the apparatus 10. FIGS. 22A, 22B and 22C are interrelated and provide a diagrammatical illustration of the electrical and electromechanical portions of the control system. FIGS. 23 and 24 respectively diagrammatically illustrate the pressurized air system and vacuum system of the apparatus 10 which each forms a part of the control system of the present invention.

Three phase AC voltage from a suitable source is provided to the apparatus of the present invention via a master control switch 938 and power conduits 1L1, 1L2 and 1L3 and fuses F1, F2, F3, F4, F5 and F6. Power conduits 1L2 and 1L3 are connected to the primary transformer winding of the clutch-brake control circuit of the automatic indexer assembly 24 as shown in FIG. 22C. Power conduits 2L1, 2L2 and 2L3 provide power from fuses F4, F5 and F6 to the main drive motor 26, curling motor 654, grooving motor 704, vacuum pump motor 20 and disc feed motor 374 via respective temperature overload panels 1TOL, 2TOL, 3TOL, 4TOL and 5TOL. The primary windings of a transformer T1 are connected across conduits 1L1 and 1L3. The secondary winding of the transformer T1 provides a nominal 115 volt AC potential to the control circuitry of the control system. The control circuitry is illustrated in a latter schematic with each rung of the latter identified by a series of line numbers arrayed down the left side of the schematic diagram.

Starting with line 1, the fuse F7, preferably an FNM2 fuse, is located in what is understood to be the higher potential or "hot" side of the transformer T1. Line 2 contains the LT1 "control power on" lamp which indicates that control power is on and that the main disconnect at the switch 938 has been turned on. Lines 3 through 7, inclusive, provide control of the ring feed trough gating.

"Ring gate on" PB1 is a mechanical latch pushbutton which, when turned on, energizes solenoid control valve 1SOL to cause the power cylinder 246, mounted in the bottom of the ring input trough, to extend, thereby blocking further entry of rings through the ring input trough to the dial plate. The "low disc supply" limit switch LS1 mounted adjacent to the disc stack at the disc feed station 300 senses the presence of a sufficient disc supply, and, when such supply is low, activates timer relay TD1 to begin timing. A suitable timer relay for this purpose is available from Potter & Brumfield and is designated as CDB-38-70002. The limit switch LS1 also energizes relay 1CR causing the alarm horn AH1 in line 35 to sound an audible alarm to alert the operator to the need for disc replenishment. A suitable alarm horn for this purpose is designated as the Sonalert SC110. The "low disc supply" indicator LT2 will also be actuated by the limit switch LS1 and will alert the operator that the audible alarm is sounding to indicate low disc supply at the disc feed station. The operator must then replenish the disc supply before the preset time of the timer relay TD1 expires or the solenoid control valve 1SOL will be automatically energized at the end of the TD1 timing period thus shutting off entrance to the ring input trough.

When limit switch LS1 contacts a replenished disc supply, the ring feed solenoid control valve 1SOL will be deenergized allowing immediate resumption of ring feed at the ring feed station. It should also be noted that when the operator hears an audible alarm, actuated for any reason, the operator can press "alarm silence" button PB12 at line 36 and the alarm will be silenced while the respective warning lamp will remain on until the cause of the alarm is corrected.

Lines 8 through 11, inclusive, indirectly control the disc feed carriage power cylinder 334, the rake power cylinder 404 and the punch-down stroke of the power cylinder 422. The operation of each of these various cylinders is dependent on the presence of a ring on a mandrel moving from the dwell position adjacent the ring feed station on the way to the next dwell position at the disc feed station. When a ring is present on a mandrel 54 moving from the ring feed station, such ring contacts the actuator 174 of the ring sensor limit switch LS2 in line 8 as the ring begins its forward index toward the disc feed station. This momentary closing of limit switch LS2 energizes control relay 2CR which latches itself in the on position through one set of normally open 2CR contacts in line 9. At this same instant, disc feed solenoid control valve 2SOL is energized causing the disc feed carriage power cylinder 334 to extend, which in turn causes the disc feed carriage to engage and move the lowermost disc from the stack into the feed or nip rolls of the disc feed station. The cylinder 334 will remain extended until cam switch CS1A opens the disc feed circuit, thus causing the control relay 2CR and solenoid control valve 2SOL to deenergize and causing the cylinder 334 to retract. The cam switches discussed herein are components of the Gemco limit switch mechanism 70 described above. Cam switch CS6B, preset at a desired point with respect to the index cycle of the dial plate 50, closes for a predetermined amount of rotation causing the control relay 3CR to latch on through one set of normally open 3CR contacts as seen in line 11 thus energizing solenoid control valve 3SOL when cam switch CS2A closes to cause retraction of the rack cylinder 404 thus causing the rake to push the disc just fed by the feed rolls on into the punch die area. Both the disc feed and rake extending circuits remain latched on until the end of the dwell period at which time cam switch CS1A momentarily opens to unlatch control relay 2CR and/or control relay 3CR so that the next ring feed can retrigger the above-described sequence.

Lines 13, 14 and 15 control the eject air system. The eject air system functions repeatedly every cycle or index of the dial plate regardless of whether rings are present on the mandrels or not. Cam switch CS3 shifts to contact B at the approximate midpoint of the dwell time period of the dial plate, thereby energizing the "air up" solenoid control valve 5SOL in line 15, thus causing air to be ejected through the aperture 60 in the mandrel 54 via the backup plate assembly 900 adjacent the closure ejecting station 800 to expel a ring-type closure upwardly from the mandrel in conjunction with the vacuum actuated vacuum head assembly 814. At the end of the predetermined dwell time period, cam switch CS3 shifts to contact A, energizing time delay relay TD3 in line 14, preferably a Syracuse delay timer designated by the number TER00300, and simultaneously energizing the "air out" solenoid control valve 4SOL so as to eject air through the nozzle 888 at the closure ejecting station 800 to propel a ring-type closure generally horizontally through the exit trough 866. After a preset time interval, the time delay relay TD3 opens its timed "off" contacts in line 13 thereby deenergizing solenoid control valve 4SOL thus stopping air ejection from the nozzle 888. The preset time delay of the time delay relay TD3 can be any suitable period, but generally is in the range from about 1 to about 3 seconds.

Lines 16 and 17 control the disc punch power cylinder 422. Cam switch CS4 shifts to contact B at approximately the start of the dwell time period of the dial plate 50, and indirectly controls the punch-down stroke of the cylinder 422 by energizing the "punch-down" solenoid control valve 7SOL, if and only if the previously described ring feed circuit was activated by the ring sensor limit switch LS2 in line 8. After sufficient rotation of the cam associated with cam switch CS4 has elapsed allowing adequate punch stroke to insert a generally circular disc into a generally cylindrical ring, cam switch contact CS4 shifts to contact A thus energizing the "punch up" solenoid control valve 6SOL, thereby causing the cylinder 422 to retract and return the punch to the "up" position.

Lines 19 and 20 control the index capability of the apparatus 10 through the use of air pressure switch PS1, preferably set at a decreasing pressure of 40 psi, to block the operation of the automatic indexer assembly 24 if sufficient air pressure is not available to operate the disc punch and adhesive-lubrication control systems. A suitable pressure switch for use in this instance is the CCS Dual Snap, identified by the number 611G2. Loss of air pressure in excess of 40 psi causes the pressure switch PS1 to close its contacts thereby energizing control relay 4CR in line 19 resulting in the sounding of the audible alarm AH1 in line 35 and lighting the "low air supply" lamp LT3 in line 20, indicating low air supply on the consolet 78. As mentioned above, the operator can use the "alarm silence" pushbuttons PB12 in line 36 from the consolet 78 to silence the audible alarm AH1 while correcting the cause of low pressure. When the control relay 4CR in line 19 is energized, the relay opens one normally closed set of contacts in line 23 thus deenergizing indexer start run function relays which include time delay relay TD2, control relay CRM and clutch brake control relay CBR. The deenergizing of the clutch brake control relay CBR energizes the brake on the automatic indexer assembly 24 by opening a normally open set of contacts of the clutch brake control relay CBR in the electrical circuitry of the automatic indexer assembly 24 as illustrated in FIG. 22C. A pressurized air supply in excess of 40 psi will open the contacts of pressure switch PS1, deenergizing control relay 4CR in line 19 and extinguishing the "low air supply" lamp LT3 in line 20, thereby closing the contacts of control relay 4CR in line 23 to allow restart or initial start of the clutch circuit of the automatic indexer assembly 24.

Lines 21 through 33, inclusive, control the use of the automatic indexer assembly 24 and auxiliary motors. The auxiliary motors include the curling motor 654, the grooving motor 704, the vacuum pump motor 20 and the disc feed motor 374 as schematically illustrated in FIG. 22C. Emergency stop pushbuttons PB2 and PB3 remove power from all motors and cause application of indexer "brake" by deenergizing control relay CBR in line 26. A Flaton overload limit switch LS3, supplied as an integral part of the automatic indexer assembly 24 and mounted onto the speed reducer 28 of the indexer assembly, senses any overload torque above a preset "main cam follower torque load capacity" and closes the normally open contacts of the limit switch LS3 to energize control relay 5CR and "turret overload" indicator light LT4 in lines 21 and 22 and simultaneously sound the audible alarm AH1 in line 35. The closing of the normally open contacts of the limit switch LS3 also causes removal of power from the main drive motor 26 and energizes the indexer brake of the indexer assembly 24 as described above. The "turn manual crank/off" control button PB7 in line 23 can then be actuated by pressing the "turn manual crank" portion PB7A which results in the prevention of any further main drive power from the main drive motor 26, energizes the "clutch manual" indicator lamp LT6 on the consolet 78, and energizes the clutch of the automatic indexer assembly 24 through the clutch brake relay CBR in line 26 when the hand crank safety interlock lever 90 is actuated to permit engagement of the hand crank crankshaft 80 with the speed reducer input shaft 32 via the shaft coupling elements 86 and 88. With the hand crank mechanism thus drivingly connected to the speed reducer input shaft, the operator can then hand crank the indexer assembly 24 if desired to remove an obstacle or correct a cause of overload. The auxiliary motors 654, 704, 20 and 374 can be stopped, if desired, by pressing the "stop" pushbutton PB10 on the consolet 78 or emergency stop buttons PB2 on the consolet 78 or PB3 carried by the tool mounting plate 16 on the opposite side of the apparatus from the consolet 78.

The "stop" button PB4 in line 23 also controls the indexer assembly 24 by deenergizing only the clutch thereof through the control relay CBR while simultaneously energizing the brake of the indexer assembly 24. It should be noted that the indexer assembly clutch cannot be energized without energizing the starter 1M of the main drive motor 26 as shown in line 30, except when using "turn manual crank" pushbutton PB7 and limit switch LS4 to hand crank the indexer assembly 24.

Pushing the indexer run "start" button PB5 in line 23 energizes time delay relay TD2 and control relay CRM. Control relay CRM latches the start circuit "on" and the "delay on" time delay relay TD2 illuminates the "indexer start warning" indicator light LT5 in line 27 and activates the audible alarm AH1 in line 35, thereby indicating a start run alert during the timing period of the delay on relay TD2. Although any suitable timing period for the delay on relay TD2 can be employed, it is presently preferred to set a time delay of about 5 seconds on the relay TD2. After the predetermined timing period has elapsed, the contacts of the delay on relay TD2 are shifted from line 27 to line 26 thereby energizing clutch brake relay CBR which closes the CBR contact in the clutch brake control circuitry of the indexer assembly 24 as illustrated in FIG. 22C to thereby cause indexing of the dial plate 50.

The auxiliary motor starter relay 2M in line 32 must be energized before the main drive motor starter relay 1M can be energized. Overloading any auxiliary motor will cause its respective temperature overload panel 2TOL, 3TOL, 4TOL or 5TOL, to open which will in turn deenergize the motor starter relays 1M and 2M by opening the 2M relay contacts in line 30. The auxiliary motors "motor run" indicator light LT8 is illuminated whenever the auxiliary motors starting relay 2M is energized as shown in line 33. The drive motor "motor run"

indicator light LT7 is illuminated whenever the drive motor starting relay 1M is energized as shown in line 31.

Lines 34 through 38, inclusive, control the audible alarm horn AH1. The relay contacts 1CR, 4CR, 5CR, 7CR, CBR and CRM shown connected in parallel in lines 34 through 38, inclusive, provide selective energization of the audible alarm circuit. Control relay 6CR is energized by the previously mentioned "alarm silence" button PB12 in line 36 to silence the audible alarm AH1 in line 35 and latch itself "on" by the normally open 6CR contacts in line 37 energizing the "alarm silenced" light LT10.

Lines 25, 39 and 40 allow jogging of the indexer assembly 24 by energizing the clutch brake control relay CBR and thereby activating the clutch in the automatic indexer assembly 24. If the apparatus 10 fails to eject an assembled ring-type closure from the mandrel adjacent the closure ejecting station 800, the limit switch LS7 will be momentarily closed by contact of its actuator 176 with the non-ejected closure as the dial plate is indexed to the next dwell position. This momentary closure of the limit switch LS7 energizes the control relay 7CR in line 39 and the 7CR relay coil will latch "on" through one set of normally open 7CR relay contacts in line 40. The "eject failure" lamp LT9 will also be illuminated upon the closure of the contacts of the limit switch LS7 and the resulting closure of the 7CR relay contact in line 40. The indexer brake of the indexer assembly 24 will also be energized by the opening of the normally closed 7CR relay contacts in line 23 in response to the energization of the control relay 7CR by deenergizing the clutch brake relay CBR in line 26. Pushing the "jog" button PB6 on the consolet 78 and located on lines 25, 39 and 40, will unlatch control relay 7CR in line 39 and the 7CR relay contacts in lines 40, 37 and 23 and will simultaneously energize the clutch brake control relay CBR in line 26 to activate the clutch in the indexer assembly 24 to index the dial plate 50.

Lines 41 and 42 control the application of adhesive and lubricant. Cam switch CS5B in line 41 is open at the start of indexing movement of the dial plate 50 but recloses after approximately 30° of rotation of the dial plate which, if a generally cylindrical ring is positioned on a mandrel 54 as it passes the actuator 430 of limit switch LS8, will cause the ring to engage the actuator 430 thereby closing the contacts of limit switch LS8 and causing the control relay 8CR to latch "on" through normally open 8CR relay contacts in line 41 and energize the solenoid control valve 8SOL which, in turn, causes the retraction of the pump terminator power cylinder 618 at the adhesive dispensing station 500 thereby allowing the vertical reciprocation of the platen 52 to cycle the adhesive pump assembly 558 and lubricant pump assembly 560.

As mentioned earlier, the clutch brake control circuit supplied with the automatic indexer assembly 24 by the Ferguson Machine Company, is schematically illustrated in FIG. 22C. The only modification of this circuitry for use in the apparatus 10 is the addition of the normally open relay contacts of clutch brake control relay CBR in series with control relay A of the original control circuit. Closure of the normally open CBR relay contacts activates the run clutch of the indexer assembly 24 while opening these CBR relay contacts deactivates the clutch and activates the brake. Both the clutch and brake voltages are selectible from 0 to 90 VDC.

Limit switches LS5 and LS6 in line 24 are provided as safety guard interlocks for use with safety guards mounted respectively over the belt drive mechanisms of the curling station 650 and the grooving station 700 (not shown).

From the foregoing detailed description, it will be seen that the apparatus 10 and the control system therefor eminently achieves the objects of the present invention. The apparatus is capable of assembling ring-type covers at the rate of about 100 covers per minute. Changes may be made in the combination and arrangement of parts or elements as heretofore set forth in the specification and shown in the drawings without departing from the spirit and scope of the invention as defined in and limited only by the following claims.

That which is claimed is:

1. In an apparatus for assembling closures, each closure including a generally cylindrically shaped ring and a generally circular disc, said apparatus being of the type which includes a plate having an upper surface and a plurality of ring receiving means on the upper surface equally spaced along a circle on said plate and each adapted for receiving one of said rings thereon; plate drive means operatively related to said plate for rotating said plate about an axis of rotation concentric with the circle along which said ring receiving means are equally spaced; ring feed means positioned adjacent said plate for sequentially positioning said rings on respective ones of said ring receiving means as said plate is rotated past said ring feed means; disc feed means positioned adjacent said plate for sequentially positioning said discs within respective ones of said rings on said ring receiving means as said plate is rotated past said disc feed means; adhesive dispensing means positioned adjacent said plate for dispensing a quantity of adhesive within respective ones of said rings on said ring receiving means as said plate is rotated past said adhesive dispensing means; lubricant dispensing means positioned adjacent said plate for dispensing a quantity of lubricant on respective ones of said rings on said ring receiving means as said plate is rotated past said lubricant dispensing means; and ejecting means positioned adjacent said plate for ejecting respective ones of said closures assembled by said apparatus from said ring receiving means as said plate is rotated past said ejecting means, a control system comprising:

first ring sensing means positioned intermediate said ring feed means and said disc feed means for sensing the presence of one of said rings on one of said ring receiving means passing thereby and providing a signal indicating the presence of said ring on said ring receiving means; and means responsive to said signal from said first ring sensing means and operatively related to said disc feed means for automatically allowing the positioning of one of said discs by said disc feed means within one of the open ends of said ring sensed by said first ring sensing means, and, alternately, in the absence of said signal from said first ring sensing means, preventing action by said ring feed means to position one of said discs on one of said ring receiving means not having one of said rings thereon.

2. Apparatus in accordance with claim 1 characterized further to include:

disc supply sensing means positioned proximate to said disc feed means for sensing the existence of an inadequate supply of discs of less than a predetermined quantity for positioning by said disc feed means and providing a signal indicating the existence of such inadequate supply of said discs; and means responsive to said signal from said disc supply sensing means and operatively related to said ring feed means for automatically preventing the positioning of said rings by said ring feed means on said ring receiving means, and, alternately, in the absence of said signal from said disc supply sensing means, automatically allowing the positioning of said rings on said ring receiving means by said ring feed means.

3. Apparatus in accordance with claim 1 or claim 2 characterized further to include:

second ring sensing means positioned adjacent said disc feed means for sensing the presence of one of said rings on one of said ring receiving means adjacent said disc feed means and providing a signal indicating the presence of said ring at said disc feed means; and means responsive to said signal from said second ring sensing means and operatively related to said adhesive dispensing means for automatically allowing the dispensing of a quantity of adhesive by said adhesive dispensing means within one of said open ends of said ring sensed by said second ring sensing means, and, alternately, in the absence of said signal from said second ring sensing means, automatically preventing the dispensing of a quantity of adhesive by said adhesive dispensing means adjacent one of said ring receiving means not having one of said rings thereon.

4. Apparatus in accordance with claim 1 characterized further to include:

third ring sensing means positioned intermediate said ejecting means and said ring feed means for sensing the presence of one of said rings on one of said ring receiving means and providing a signal indicating the presence of said ring intermediate said ejecting means and said ring feed means; and means responsive to said signal from said third ring sensing means and operatively related to said plate drive means for automatically preventing the rotating of said plate by said plate drive means, and, alternately, for automatically allowing the rotating of said plate by said plate drive means in the absence of said signal from said third ring sensing means.

5. Apparatus in accordance with claim 3 characterized further to include:

second means responsive to said signal from said second ring sensing means and operatively related to said lubricant dispensing means for automatically allowing the dispensing of a quantity of lubricant by said lubricant dispensing means on said ring sensed by said second ring sensing means, and, alternately, in the absence of said signal from said second ring sensing means, automatically preventing the dispensing of a quantity of lubricant by said lubricant dispensing means adjacent one of said ring receiving means not having one of said rings thereon.

6. Apparatus in accordance with claim 1 or claim 4 characterized further to include:

drive overload sensing means operatively related to said plate drive means for sensing a load on said plate drive means exceeding a predetermined value and providing an overload signal indicating the existence of a load on said plate drive means exceeding said predetermined value; and means responsive to said overload signal from said drive overload sensing means for automatically preventing the operation of said plate drive means for rotating said plate, and, alternately, in the absence of said overload signal from said drive overload sensing means, for automatically allowing the rotating of said plate by said plate drive means.

7. Apparatus in accordance with claim 5 characterized further to include:

drive overload sensing means operatively related to said plate drive means for sensing a load on said plate drive means exceeding a predetermined value and providing an overload signal indicating the existence of a load on said plate drive means exceeding said predetermined value; and means responsive to said overload signal from said drive overload sensing means for automatically preventing the operation of said plate drive means for rotating said plate, and, alternately, in the absence of said overload signal from said drive overload sensing means, for automatically allowing the rotating of said plate by said plate drive means.

8. Apparatus in accordance with claim 1 characterized further to include:

disc supply sensing means positioned proximate to said disc feed means for sensing the existence of an inadequate supply of said discs of less than a predetermined quantity for positioning by said disc feed means and providing a signal indicating the existence of such inadequate supply of said disc;

means responsive to said signal from said disc supply sensing means and operatively related to said ring feed means for automatically preventing the positioning of said rings by said ring feed means on said ring receiving means, and, alternately, in the absence of said signal from said ring supply sensing means, automatically allowing the positioning of said rings on said ring receiving means by said ring feed means;

second ring sensing means positioned adjacent said disc feed means for sensing the presence of one of said rings on one of said ring receiving means adjacent said disc feed means and providing a signal indicating the presence of said ring at said disc feed means;

means responsive to said signal from said second ring sensing means and operatively related to said adhesive dispensing means for automatically allowing the dispensing of a quantity of adhesive by said adhesive dispensing means within one of said open ends of said ring sensed by said second ring sensing means, and, alternately, in the absence of said signal from said second ring sensing means, automatically preventing the dispensing of a quantity of adhesive by said adhesive dispensing means adjacent one of said ring receiving means not having one of said rings thereon;

third ring sensing means positioned intermediate said ejecting means and said ring feed means for sensing the presence of one of said rings on one of said ring receiving means and providing a signal indicating the presence of said ring intermediate said ejecting means and said ring feed means;

means responsive to said signal from said third ring sensing means and operatively related to said plate drive means for automatically preventing the rotating of said plate by said plate drive means, and, alternately, for automatically allowing the rotating of said plate by said plate drive means in the absence of said signal from said third ring sensing means;

drive overload sensing means operatively related to said plate drive means for sensing a load on said plate drive means exceeding a predetermined value and providing an overload signal indicating the existence of a load on said plate drive means exceeding said predetermined value;

means responsive to said overload signal from said drive overload sensing means for automatically preventing the operating of said plate drive means for rotating said plate, and, alternately, in the absence of said overload signal from said drive overload sensing means, for automatically allowing the rotating of said plate by said plate drive means;

audible alarm means responsive to any one of said signals from said disc supply sensing means, said third ring sensing means, said drive overload sensing means, and any combination of two or more of said signals for providing an audible signal indicating the existence of at least one of said conditions being sensed by said disc supply sensing means, said third ring sensing means, and said third drive overload sensing means.

9. Apparatus in accordance with claim 8 characterized further to include:

first light means responsive to said signal from said first ring sensing means for providing a visual signal indicating and identifying the existence of the condition being sensed by said first ring sensing means.

10. Apparatus in accordance with claim 8 or claim 9 characterized further to include second light means responsive to said signal from said second ring sensing means for providing a visual signal indicating and identifying the existence of the condition being sensed by said second ring sensing means.

11. Apparatus in accordance with claim 8 characterized further to include:

third light means responsive to said signal from said third ring sensing means for providing a visual signal indicating and identifying the existence of the condition being sensed by said third ring sensing means.

12. Apparatus in accordance with claim 8 or claim 11 characterized further to include:

fourth light sensing means responsive to said signal from said disc supply sensing means for providing a visual signal indicating and identifying the existence of the condition being sensed by said disc supply sensing means.

13. Apparatus in accordance with claim 8 characterized further to include:

fifth light sensing means responsive to said signal from said drive overload sensing means for providing a visual signal indicating and identifying the existence of the condition being sensed by said drive overload sensing means.

14. Apparatus in accordance with claim 2 wherein said means responsive to said signal from said disc supply sensing means is characterized further to include:

delay timer means for providing a predetermined automatic time delay between the time of receipt of said signal from said disc sensing means and the time of automatic prevention of the positioning of said rings by said ring feed means on said ring receiving means so as to provide sufficient time for replenishing the supply of said discs to achieve an adequate supply of said discs in excess of said predetermined quantity thereby cancelling the signal from said disc sensing means and automatically allowing the positioning of said rings on said ring receiving means by said ring feed means.

15. Apparatus in accordance with claim 1 characterized further to include:

hand crank means journaled adjacent said drive means, said hand crank means including a crank shaft rotatable about the rotational axis thereof and having first and second end portions; a hand crank drivingly secured to the first end portion of said crank shaft; first coupling means drivingly secured to the second end portion of said crank shaft; and said crank shaft being longitudinally movable along the rotational axis thereof between a first position distal from said plate drive means and a second position proximate to said plate drive means;

second coupling means drivingly secured to said plate drive means, said second coupling means being adapted to drivingly engage said first coupling means when said crank shaft is in the second position thereof, and, alternately, disengage from said first coupling means when said crank shaft is in the first position thereof; and drive control means operatively connected to said plate drive means and responsive to the position of said crankshaft whereby said drive control means permits said plate drive means to rotate said plate about an axis of rotation when said crankshaft is in the first position thereof, and, alternately whereby said drive control means prevents the rotating of said plate about an axis of rotation by said plate drive means when said crank shaft is in the second position thereof, thus permitting manual rotation of said plate by said hand crank means via said plate drive means.

16. Apparatus in accordance with claim 15 wherein:

said plate drive means is characterized further to include electric drive motor means for providing driving force for rotating said plate about an axis of rotation; and wherein said drive control means includes electrical switch means electrically connected to said electric drive motor means and responsive to the position of said crank shaft whereby said electrical switch means permits electrical current to flow to said electric drive motor means when said crank shaft is in the first position thereof, and, alternately, whereby said electrical switch means prevents electric current flow to said electric drive motor means when said crank shaft is in the second position thereof.

17. Apparatus in accordance with claim 1 characterized further to include:

cam operated switch means drivingly connected to said plate drive means and operatively connected to said disc feed means, said adhesive dispensing means, said lubricant dispensing means and said ejecting means for synchronizing the operations of said disc feed means, said adhesive dispensing means, said lubricant dispensing means and said ejecting means with the rotation of said plate by said plate drive means.

18. A control system for use with an apparatus for assembling closures, each closure including a generally cylindrically shaped ring, having a generally cylindrical outer surface and generally circular open ends, and a generally circular disc, said apparatus being of the type which includes a plate having an upper surface and a plurality of ring receiving means on the upper surface equally spaced along a circle on said plate and each adapted for receiving one of said rings thereon; plate drive means operatively related to said plate for rotating said plate about an axis of rotation concentric with the circle along which said ring receiving means are equally spaced; ring feed means positioned adjacent said plate for sequentially positioning said rings on respective ones of said ring receiving means as said plate is rotated past said ring feed means; disc feed means positioned adjacent said plate for sequentially positioning said discs within respective ones of said rings on said ring receiving means as said plate is rotated past said disc feed means; adhesive dispensing means positioned adjacent said plate for dispensing a quantity of adhesive within respective ones of said rings on said ring receiving means as said plate is rotated past said adhesive dispensing means; lubricant dispensing means positioned adjacent said plate for dispensing a quantity of lubricant on respective ones of said rings on said ring receiving means as said plate is rotated past said lubricant dispensing means; and ejecting means positioned adjacent said plate for ejecting respective ones of said closures from said ring receiving means as said plate is rotated past said ejecting means, said control system comprising:

first ring sensing means positioned intermediate said ring feed means and said disc feed means for sensing the presence of one of said rings on one of said ring receiving means passing said first ring sensing means and providing a signal indicating the presence of said ring on said ring receiving means; and means responsive to said signal from said first ring sensing means and operatively related to said disc feed means for automatically allowing the positioning of one of said discs by said disc feed means within one of the open ends of said ring sensed by said first ring sensing means, and, alternately, in the absence of said signal from said first ring sensing means, preventing action by said ring feed means to position one of said discs on one of said ring sensing means not having one of said rings thereon.

19. A control system in accordance with claim 18 characterized further to include:

disc supply sensing means positioned approximate to said disc feed means for sensing the existence of an inadequate supply of discs of less than a predetermined quantity for positioning by said disc feed means and providing a signal indicating the existence of such inadequate supply of said discs; and means responsive to said signal from said disc supply sensing means and operatively related to said ring feed means for automatically the positioning of said rings by said ring feed means on said ring receiving means, and, alternately, in the absence of said signal from said disc supply sensing means, automatically allowing the positioning of said rings on said ring receiving means by said ring feed means.

20. A control system in accordance with claim 18 or claim 19 characterized further to include:

second ring sensing means positioned adjacent said disc feed means for sensing the presence of one of said rings on one of said ring receiving means adjacent said disc feed means and providing a signal indicating the presence of said ring at said at said disc feed means; and means responsive to said signal from said second ring sensing means and operatively related to said adhesive dispensing means for automatically allowing the dispensing of a quantity of adhesive by said adhesive dispensing means within one of said open ends of said ring sensed by said second ring sensing means, and, alternately, in the absence of said signal from said second ring sensing means, automatically preventing the dispensing of a quantity of adhesive by said adhesive dispensing means adjacent one of said ring receiving means not having one of said rings thereon.

21. A control system in accordance with claim 18 characterized further to include:

third ring sensing means positioned intermediate said ejecting means and said ring feed means for sensing the presence of one of said rings on one of said ring receiving means and providing a signal indicating the presence of said ring intermediate said ejecting means and said ring feed means; and means responsive to said signal from said third ring sensing means and operatively related to said plate drive means for automatically preventing the rotating of said plate by said plate drive means, and, alternately, for automatically allowing the rotating of said plate by said plate drive means in the absence of said signal from said third ring sensing means.

22. A control system in accordance with claim 20 characterized further to include:

second means responsive to said signal from said second ring sensing means and operatively related to said lubricant dispensing means for automatically allowing the dispensing of a quantity of lubricant by said lubricant dispensing means on said ring sensed by said second ring sensing means, and, alternately, in the absence of said signal from said second ring sensing means, automatically preventing the dispensing of a quantity of lubricant by said lubricant dispensing means adjacent one of said ring receiving means not having one of said rings thereon.

23. A control system in accordance with claim 18 or claim 21 characterized further to include:

drive overload sensing means operatively related to said plate drive means for sensing a load on said plate drive means exceeding a predetermined value and providing an overload signal indicating the existence of a load on said plate drive means exceeding said predetermined value; and means responsive to said overload signal from said drive overload sensing means for automatically preventing the operation of said plate drive means for rotating said plate, and, alternately, in the absence of said overload signal from said drive overload sensing means, for automatically allowing the rotating of said plate by said plate drive means.

24. A control system in accordance with claim 22 characterized further to include:

drive overload sensing means operatively related to said plate drive means for sensing a load on said plate drive means exceeding a predetermined value and providing an overload signal indicating the existence of a load on said plate drive means exceeding said predetermined value; and means responsive to said overload signal from said drive overload sensing means for automatically preventing the operation of said plate drive means for rotating said plate, and, alternately, in the absence of said overload signal from said drive overload sensing means, for automatically allowing the rotating of said plate by said plate drive means.

25. Apparatus in accordance with claim 3 characterized further to increase:

third ring sensing means positioned intermediate said ejecting means and said ring feed means for sensing the presence of one of said rings on one of said ring receiving means and providing a signal indicating the presence of said ring intermediate said ejecting means and said ring feed means; and means responsive to said signal from said third ring sensing means and operatively related to said plate drive means for automatically preventing the rotating of said plate by said plate drive means, and, alternately, for automatically allowing the rotating of said plate by said plate drive means in the absence of said signal from said third ring sensing means.

26. Apparatus in accordance with claim 25 characterized further to include:

drive overload sensing means operatively related to said plate drive means for sensing a load on said plate drive means exceeding a predetermined value and providing an overload signal indicating the existence of a load on said plate drive means exceeding said predetermined value; and means responsive to said overload signal from said drive overload sensing means for automatically preventing the operation of said plate drive means for rotating said plate, and, alternately, in the absence of said overload signal from said drive overload sensing means, for automatically allowing the rotating of said plate by said plate drive means.

27. Apparatus in accordance with claim 10 characterized further to include:

third light means responsive to said signal from said third ring sensing means for providing a visual signal indicating and identifying the existence of the condition being sensed by said third ring sensing means.

28. Apparatus in accordance with claim 27 characterized further to include:

fourth light sensing means responsive to said signal to said disc supply sensing means for providing a visual signal indicating and identifying the existence of the condition being sensed by said disc supply sensing means.

29. Apparatus in accordance with claim 28 characterized further to include:

fifth light sensing means responsive to said signal from said drive overload sensing means for providing a visual signal indicating and identifying the existence of the condition being sensed by said drive overload sensing means.

30. Apparatus in accordance with claim 12 characterized further to include:

fifth light sensing means responsive to said signal from said drive overload sensing means for providing a visual signal indicating and identifying the existence of the condition being sensed by said drive overload sensing means.

31. A control system in accordance with claim 20 characterized further to include:

third ring sensing means positioned intermediate said ejecting means and said ring feed means for sensing the presence of one of said rings on one of said ring receiving means and providing a signal indicating the presence of said ring intermediate said ejecting means and said ring feed means; and means responsive to said signal from said third ring sensing means and operatively related to said plate drive means for automatically preventing the rotating of said plate by said plate drive means, and, alternately, for automatically allowing the rotating of said plate by said plate drive means in the absence of said signal from said third ring sensing means.

32. A control system in accordance with claim 31 characterized further to include:

drive overload sensing means operatively related to said plate drive means for sensing a load on said plate drive means exceeding a predetermined value and providing an overload signal indicating the existence of a load on said plate drive means exceeding said predetermined value; and means responsive to said overload signal from said drive overload sensing means for automatically preventing the operation of said plate drive means for rotating said plate, and, alternately, in the absence of said overload signal from said drive overload sensing means, for automatically allowing the rotating of said plate by said plate drive means.

* * * * *

UNITED STATES PATENT AND TRADEMARK OFFICE

CERTIFICATE OF CORRECTION

PATENT NO. : 4,268,342

DATED : May 19, 1981

INVENTOR(S) : Jerry W. Young

It is certified that error appears in the above-identified patent and that said Letters Patent are hereby corrected as shown below:

Col. 39, line 9, after "to" and before the ":", change "increase" to ---include---.

Signed and Sealed this

*Tenth* Day of *November 1981*

[SEAL]

*Attest:*

GERALD J. MOSSINGHOFF

*Attesting Officer* *Commissioner of Patents and Trademarks*